(12) United States Patent
Elshafie et al.

(10) Patent No.: US 12,677,310 B2
(45) Date of Patent: Jul. 7, 2026

(54) WEIGHTED DECISION PROCESS-BASED RESOURCE SENSING

(71) Applicant: QUALCOMM Incorporated, San Diego, CA (US)

(72) Inventors: Ahmed Elshafie, San Diego, CA (US); Ahmed Attia Abotabl, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 959 days.

(21) Appl. No.: 17/734,353

(22) Filed: May 2, 2022

(65) Prior Publication Data

US 2023/0354400 A1 Nov. 2, 2023

(51) Int. Cl.
| | |
|---|---|
| *H04W 72/543* | (2023.01) |
| *H04W 72/1263* | (2023.01) |
| *H04W 72/20* | (2023.01) |
| *H04W 74/0808* | (2024.01) |

(52) U.S. Cl.
CPC ..... *H04W 72/543* (2023.01); *H04W 72/1263* (2013.01); *H04W 72/20* (2023.01); *H04W 74/0825* (2013.01)

(58) Field of Classification Search
CPC ............... H04W 72/543; H04W 72/20; H04W 72/1263; H04W 74/0825
See application file for complete search history.

(56) References Cited

U.S. PATENT DOCUMENTS

| | | | | |
|---|---|---|---|---|
| 2020/0037307 A1* | 1/2020 | Kang | .................... | H04W 72/04 |
| 2024/0098764 A1* | 3/2024 | Ashraf | .................. | H04W 76/14 |

FOREIGN PATENT DOCUMENTS

| | | | | | |
|---|---|---|---|---|---|
| CA | 3073572 A1 * | 5/2019 | ............ | H04W 24/10 |
| CN | 107734649 A * | 2/2018 | | |
| CN | 109391972 A * | 2/2019 | ............ | H04W 24/02 |
| CN | 116250356 A * | 6/2023 | ........ | H04W 74/0808 |
| JP | 2023532069 A * | 7/2023 | | |
| WO | WO-2015021185 A1 * | 2/2015 | ........... | H04L 5/0012 |
| WO | WO-2018028475 A1 * | 2/2018 | | |
| WO | WO-2022083642 A1 * | 4/2022 | | |

* cited by examiner

*Primary Examiner* — Saad A. Waqas
(74) *Attorney, Agent, or Firm* — Qualcomm Incorporated

(57) ABSTRACT

Methods, systems, and devices for wireless communications are described. For instance, a wireless device may receive, from a second wireless device, an indication of a set of resources associated with weighted selection of resource sensing. The wireless device may select a sensing state of a set of sensing states for the set of resources based on applying a respective weight to each sensing state of the set of sensing states. The wireless device may perform sensing over a first subset of the set of resources based on the selected sensing state and may communicate a message with a third wireless device based on respective occupancy state determinations for the set of resources, where the respective occupancy state determinations for the first subset are based on performing the sensing and the respective occupancy state determinations for a second subset of the set of resources are based on a predetermined occupancy state.

28 Claims, 12 Drawing Sheets

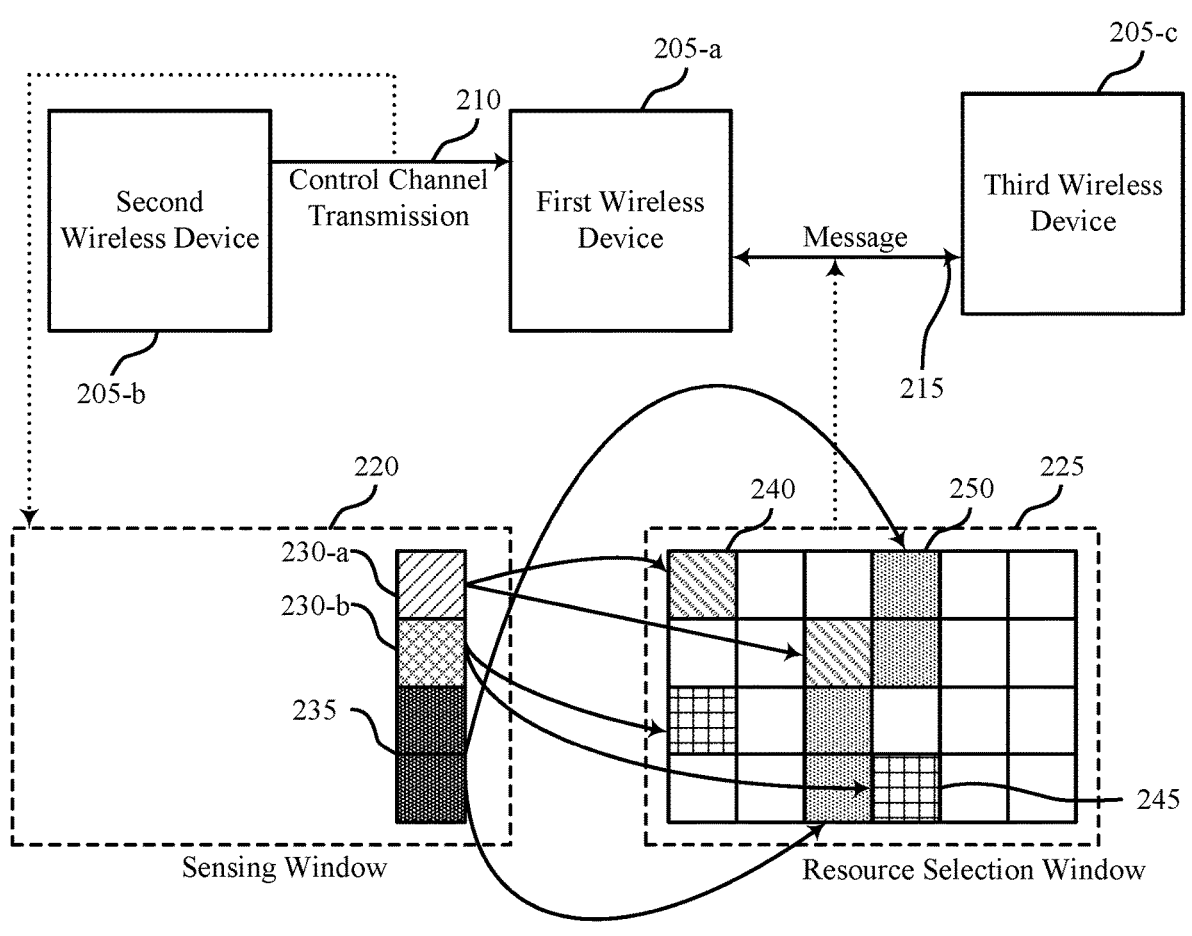
Sensing Window
Resource Selection Window
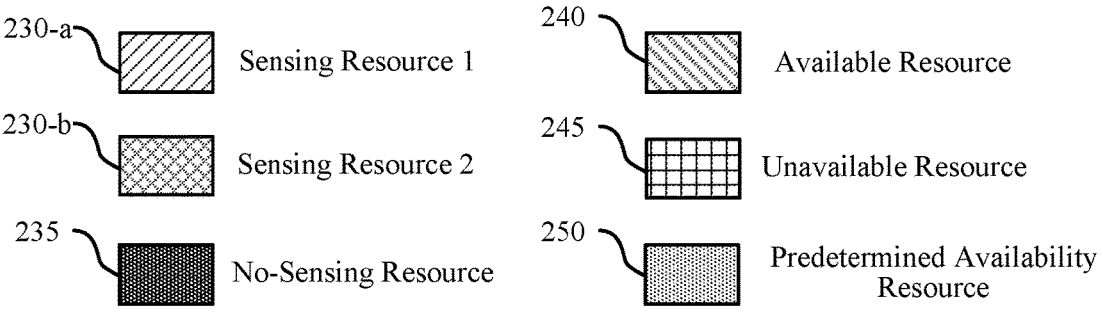
230-a — Sensing Resource 1
230-b — Sensing Resource 2
235 — No-Sensing Resource
240 — Available Resource
245 — Unavailable Resource
250 — Predetermined Availability Resource
FIG. 2
200

400

510

520

515

505

500

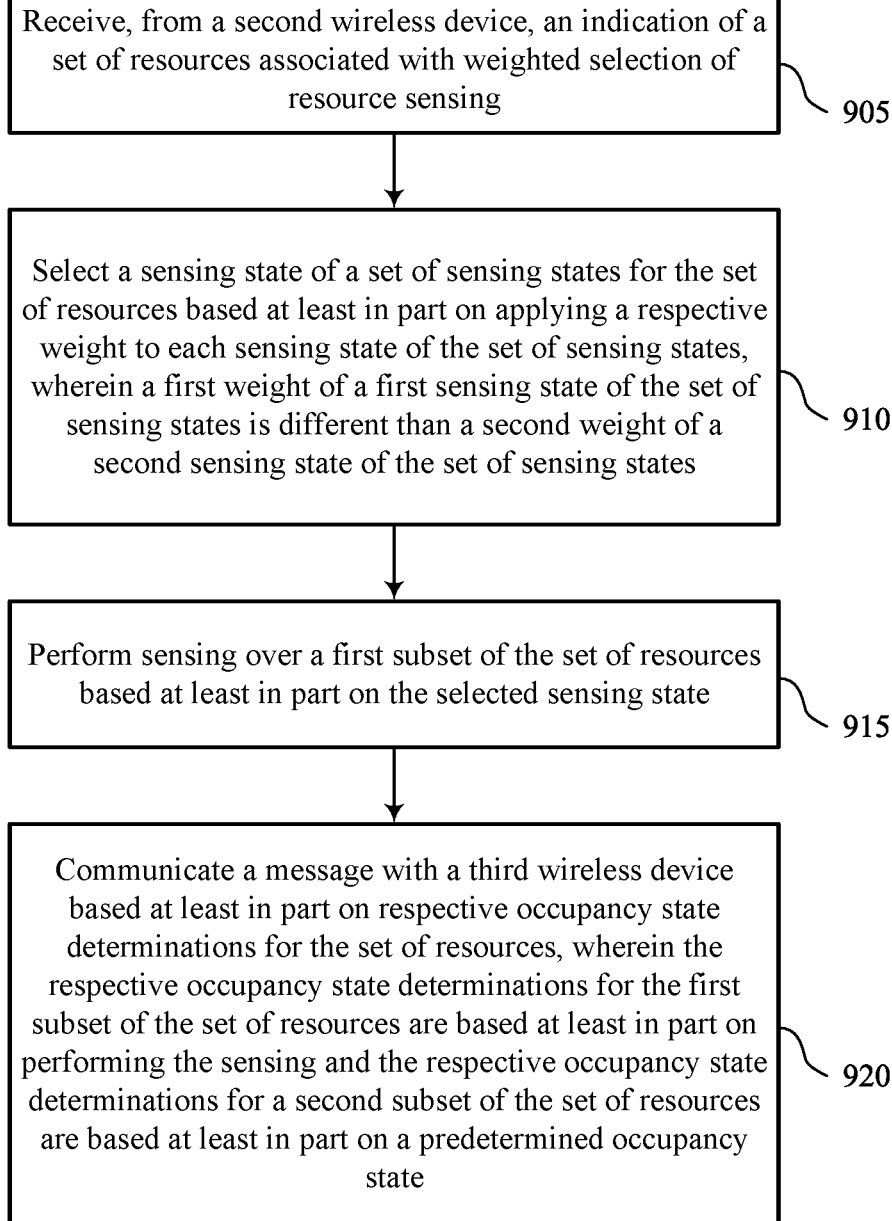

Receive, from a second wireless device, an indication of a set of resources associated with weighted selection of resource sensing

905

Select a sensing state of a set of sensing states for the set of resources based at least in part on applying a respective weight to each sensing state of the set of sensing states, wherein a first weight of a first sensing state of the set of sensing states is different than a second weight of a second sensing state of the set of sensing states

910

Perform sensing over a first subset of the set of resources based at least in part on the selected sensing state

915

Communicate a message with a third wireless device based at least in part on respective occupancy state determinations for the set of resources, wherein the respective occupancy state determinations for the first subset of the set of resources are based at least in part on performing the sensing and the respective occupancy state determinations for a second subset of the set of resources are based at least in part on a predetermined occupancy state

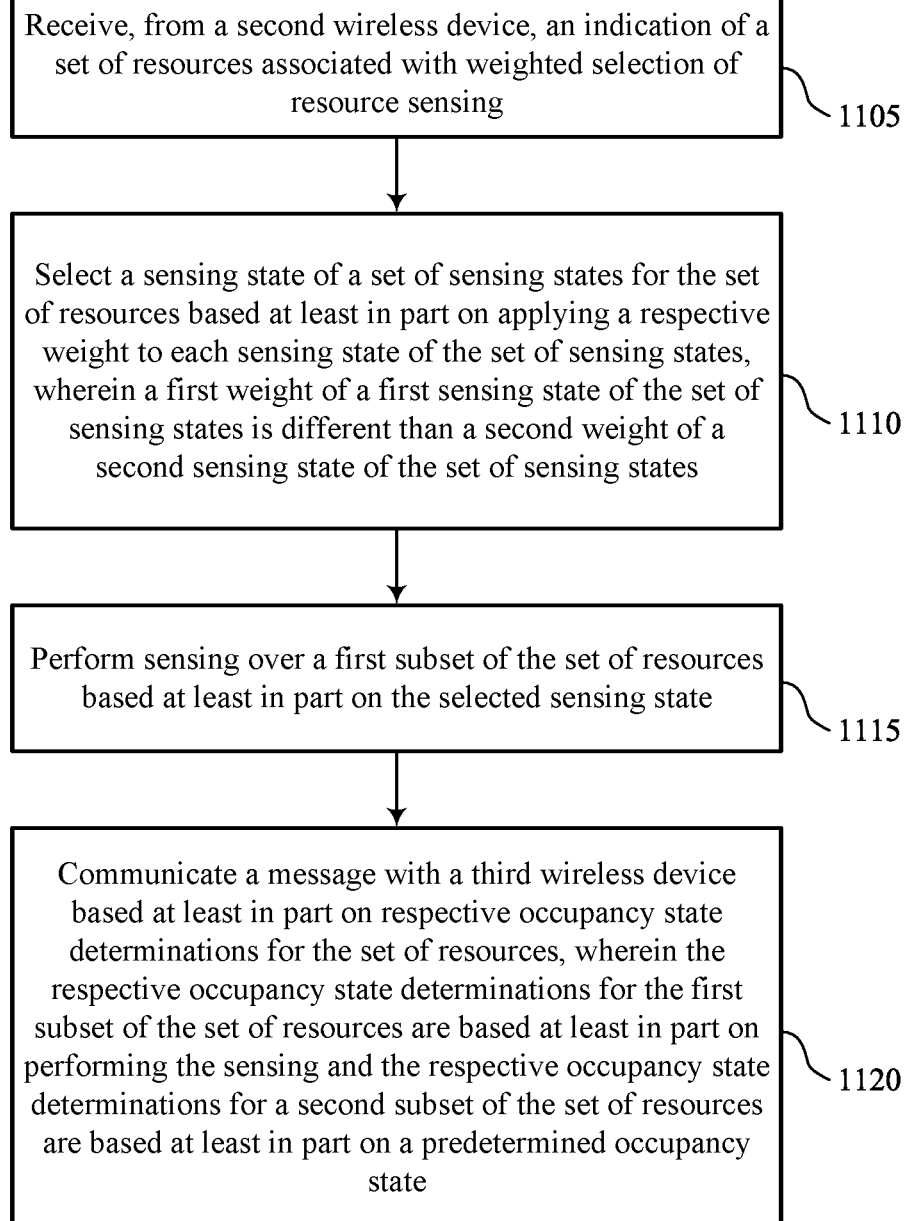

Receive, from a second wireless device, an indication of a set of resources associated with weighted selection of resource sensing

1105

Select a sensing state of a set of sensing states for the set of resources based at least in part on applying a respective weight to each sensing state of the set of sensing states, wherein a first weight of a first sensing state of the set of sensing states is different than a second weight of a second sensing state of the set of sensing states

1110

Perform sensing over a first subset of the set of resources based at least in part on the selected sensing state

1115

Communicate a message with a third wireless device based at least in part on respective occupancy state determinations for the set of resources, wherein the respective occupancy state determinations for the first subset of the set of resources are based at least in part on performing the sensing and the respective occupancy state determinations for a second subset of the set of resources are based at least in part on a predetermined occupancy state

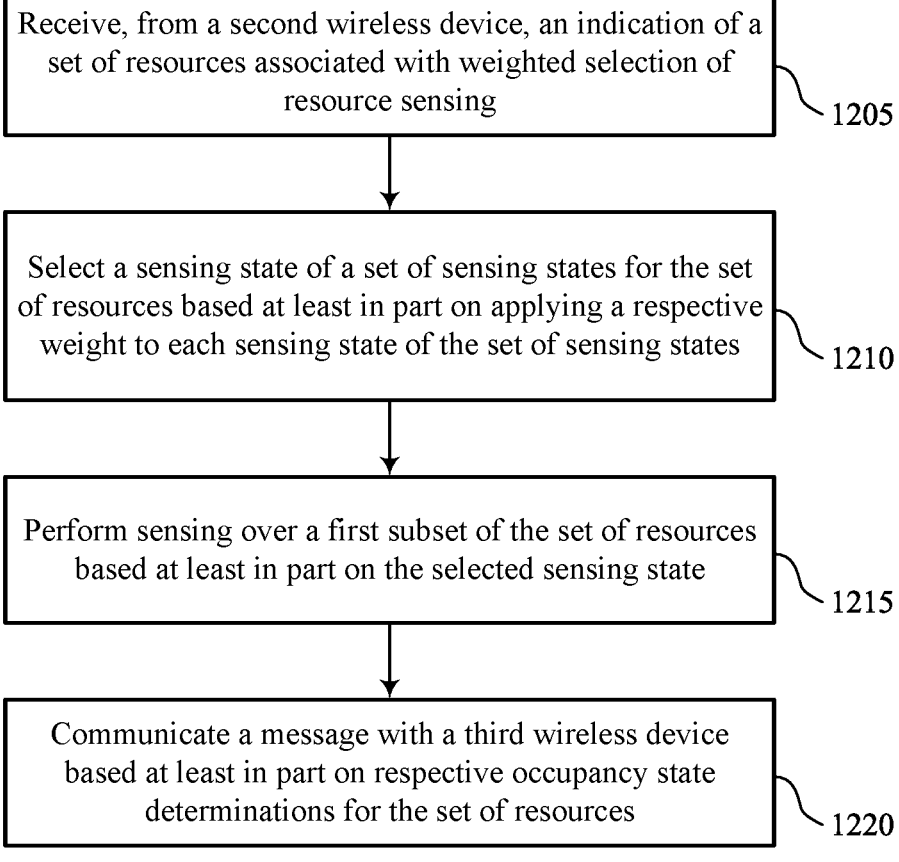

Receive, from a second wireless device, an indication of a set of resources associated with weighted selection of resource sensing

1205

Select a sensing state of a set of sensing states for the set of resources based at least in part on applying a respective weight to each sensing state of the set of sensing states

1210

Perform sensing over a first subset of the set of resources based at least in part on the selected sensing state

1215

Communicate a message with a third wireless device based at least in part on respective occupancy state determinations for the set of resources

WEIGHTED DECISION PROCESS-BASED RESOURCE SENSING

FIELD OF TECHNOLOGY

The following relates to wireless communications, including weighted decision process-based resource sensing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a first UE may receive a control channel transmission from a second UE or a base station. The first UE may determine available resources by measuring the control channel transmission and may select from among the available resources for communicating a message. In some examples, measuring the control channel transmission and then selecting from among the available resources may be associated with a greater latency then selecting among resources without first measuring a control channel transmission. However, refraining from measuring the control channel transmission to determine available resources may increase a likelihood that a collision occurs between the message and another transmission. Techniques that decrease the latency and/or decrease the likelihood of collisions may increase the efficiency of wireless communications.

SUMMARY

The described techniques relate to improved methods, systems, devices, and apparatuses that support weighted decision process-based resource sensing. Generally, the described techniques provide for a wireless device to adapt a number of resources of a set of resources that the wireless device senses over according to feedback from prior occasions in which the wireless device has performed sensing over the set of resources. For instance, the wireless device may receive, from a second wireless device, an indication of a set of resources associated with weighted selection of resource sensing. The wireless device may select a sensing state of a set of sensing states for the set of resources based on applying a respective weight to each sensing state of the set of sensing states, where a first weight of a first sensing state of the set of sensing states is different than a second weight of a second sensing state of the set of sensing states. The wireless device may perform sensing over a first subset of the set of resources based on the selected sensing state and may communicate a message with a third wireless device based on respective occupancy state determinations for the set of resources, where the respective occupancy state determinations for the first subset of the set of resources are based on performing the sensing and the respective occupancy state determinations for a second subset of the set of resources are based on a predetermined occupancy state.

A method for wireless communication at a first wireless device is described. The method may include receiving, from a second wireless device, an indication of a set of resources associated with weighted selection of resource sensing, selecting a sensing state of a set of sensing states for the set of resources based on applying a respective weight to each sensing state of the set of sensing states, where a first weight of a first sensing state of the set of sensing states is different than a second weight of a second sensing state of the set of sensing states, performing sensing over a first subset of the set of resources based on the selected sensing state, and communicating a message with a third wireless device based on respective occupancy state determinations for the set of resources, where the respective occupancy state determinations for the first subset of the set of resources are based on performing the sensing and the respective occupancy state determinations for a second subset of the set of resources are based on a predetermined occupancy state.

An apparatus for wireless communication at a first wireless device is described. The apparatus may include a processor, memory coupled with the processor, and instructions stored in the memory. The instructions may be executable by the processor to cause the apparatus to receive, from a second wireless device, an indication of a set of resources associated with weighted selection of resource sensing, select a sensing state of a set of sensing states for the set of resources based on applying a respective weight to each sensing state of the set of sensing states, where a first weight of a first sensing state of the set of sensing states is different than a second weight of a second sensing state of the set of sensing states, perform sensing over a first subset of the set of resources based on the selected sensing state, and communicate a message with a third wireless device based on respective occupancy state determinations for the set of resources, where the respective occupancy state determinations for the first subset of the set of resources are based on performing the sensing and the respective occupancy state determinations for a second subset of the set of resources are based on a predetermined occupancy state.

Another apparatus for wireless communication at a first wireless device is described. The apparatus may include means for receiving, from a second wireless device, an indication of a set of resources associated with weighted selection of resource sensing, means for selecting a sensing state of a set of sensing states for the set of resources based on applying a respective weight to each sensing state of the set of sensing states, where a first weight of a first sensing state of the set of sensing states is different than a second weight of a second sensing state of the set of sensing states, means for performing sensing over a first subset of the set of resources based on the selected sensing state, and means for communicating a message with a third wireless device based on respective occupancy state determinations for the set of resources, where the respective occupancy state determinations for the first subset of the set of resources are based on performing the sensing and the respective occupancy state determinations for a second subset of the set of resources are based on a predetermined occupancy state.

A non-transitory computer-readable medium storing code for wireless communication at a first wireless device is described. The code may include instructions executable by a processor to receive, from a second wireless device, an indication of a set of resources associated with weighted selection of resource sensing, select a sensing state of a set of sensing states for the set of resources based on applying a respective weight to each sensing state of the set of sensing states, where a first weight of a first sensing state of the set of sensing states is different than a second weight of a second sensing state of the set of sensing states, perform sensing over a first subset of the set of resources based on the selected sensing state, and communicate a message with a third wireless device based on respective occupancy state determinations for the set of resources, where the respective occupancy state determinations for the first subset of the set of resources are based on performing the sensing and the respective occupancy state determinations for a second subset of the set of resources are based on a predetermined occupancy state.

Some examples of the method, apparatuses, and non-transitory computer-readable medium described herein may further include operations, features, means, or instructions for receiving, from the second wireless device or the third wireless device, an indication of the predetermined occupancy state.

In some examples of the method, apparatuses, and non-transitory computer-readable medium described herein, the predetermined occupancy state indicates that each resource of a second set of resources to which the second subset of the set of resources map may have an available channel occupancy state, an unavailable channel occupancy state, or a selectively available channel occupancy state according to a value of a parameter.

In some examples of the method, apparatuses, and non-transitory computer-readable medium described herein, receiving the indication of the predetermined occupancy state may include operations, features, means, or instructions for receiving radio resource control signaling or medium access control (MAC) control element signaling including the indication of the predetermined occupancy state.

Some examples of the method, apparatuses, and non-transitory computer-readable medium described herein may further include operations, features, means, or instructions for receiving signaling indicating a quantity of resources in the set of resources, a quantity of resource blocks that a resource of the set of resources includes, or a combination thereof.

In some examples of the method, apparatuses, and non-transitory computer-readable medium described herein, the signaling includes radio resource control signaling, medium access control (MAC) control element signaling, or a side-link shared channel transmission.

Some examples of the method, apparatuses, and non-transitory computer-readable medium described herein may further include operations, features, means, or instructions for receiving an indication to initiate a training process for the weighted selection of resource sensing for the set of resources at the first wireless device, where selecting the sensing state may be based on receiving the indication.

Some examples of the method, apparatuses, and non-transitory computer-readable medium described herein may further include operations, features, means, or instructions for transmitting an indication of a result of the training process for the weighted selection of resource sensing for the set of resources.

Some examples of the method, apparatuses, and non-transitory computer-readable medium described herein may further include operations, features, means, or instructions for receiving an indication of a third sensing state for the set of resources and a result associated with the third sensing state and adapting the respective weights of the sensing states based on receiving the indication of the third sensing state and the result associated with the third sensing state.

Some examples of the method, apparatuses, and non-transitory computer-readable medium described herein may further include operations, features, means, or instructions for receiving, from the second wireless device, an indication of a configuration of the weighted selection of resource sensing for the set of resources, where selecting the sensing state may be based on receiving the indication of the configuration of the weighted selection of resource sensing for the set of resources.

Some examples of the method, apparatuses, and non-transitory computer-readable medium described herein may further include operations, features, means, or instructions for transmitting an indication of the selected sensing state.

Some examples of the method, apparatuses, and non-transitory computer-readable medium described herein may further include operations, features, means, or instructions for determining a quantity of resources of the set of resources based on a transport block size for the message, a modulation and coding scheme associated with the message, or a combination thereof.

Some examples of the method, apparatuses, and non-transitory computer-readable medium described herein may further include operations, features, means, or instructions for determining that a collision may have occurred over at least one resource associated with the first subset of the set of resources and adjusting the respective weight of the selected sensing state based on determining that the collision may have occurred.

Some examples of the method, apparatuses, and non-transitory computer-readable medium described herein may further include operations, features, means, or instructions for determining that a channel busy ratio satisfies a threshold and adjusting the first weight of the first sensing state to a non-zero value and the respective weight for each other sensing state of the set of sensing states to a zero value based on determining that the channel busy ratio satisfies the threshold.

In some examples of the method, apparatuses, and non-transitory computer-readable medium described herein, the respective weight of each sensing state of the set of sensing states may be based on a channel busy ratio, a channel occupancy ratio, a transmission priority, a quality of service, a battery status of the first wireless device, or any combination thereof.

In some examples of the method, apparatuses, and non-transitory computer-readable medium described herein, the occupancy state determinations for the first subset of the set of resources may be based on a signal to interference ratio, a reference signal received power, or a combination thereof for one or more resources of the first subset of the set of resources.

In some examples of the method, apparatuses, and non-transitory computer-readable medium described herein, the first wireless device includes a first user equipment (UE), the third wireless device includes a second UE, and the second wireless device includes a third UE or a base station.

BRIEF DESCRIPTION OF THE DRAWINGS

FIG. 2 illustrates an example of a wireless communications system that supports weighted decision process-based resource sensing in accordance with aspects of the present disclosure.

FIGS. 9 through 12 show flowcharts illustrating methods that support weighted decision process-based resource sensing in accordance with aspects of the present disclosure.

DETAILED DESCRIPTION

Figure 1:
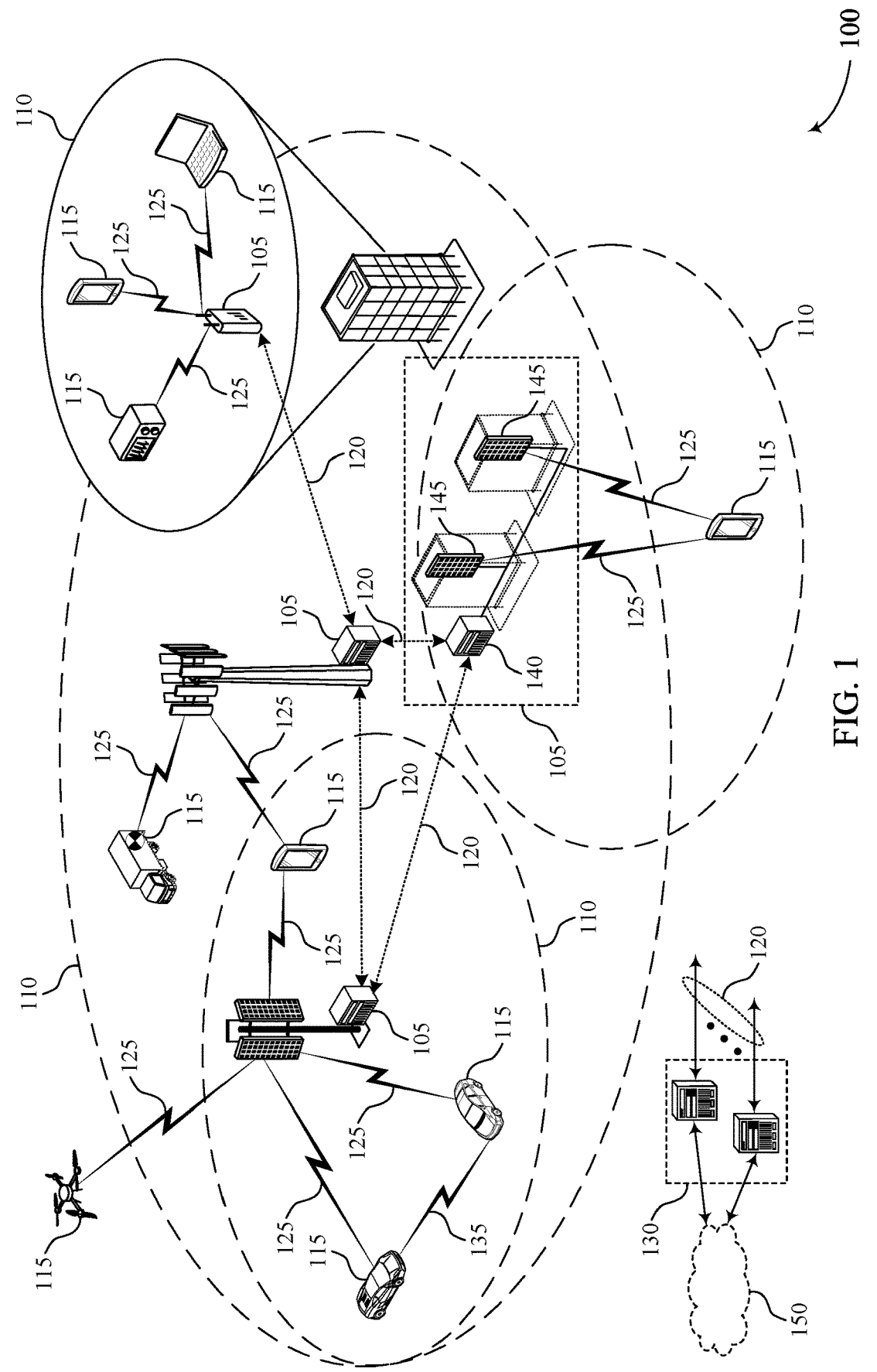
FIG. 1 illustrates an example of a wireless communications system that supports weighted decision process-based resource sensing in accordance with aspects of the present disclosure.

A first wireless device (e.g., a user equipment (UE) or a base station) may receive a control channel transmission (e.g., sidelink control information (SCI), downlink control information (DCI), uplink control information (UCI)) from a second wireless device (e.g., a UE or a base station). In some examples, the first wireless device may receive the control channel transmission over a first set of resources in a sensing window, where the control channel transmission may indicate a second set of resources in a resource selection window. For instance, each resource of the first set of resources may map to a respective one or more resources of the second set of resources. In some examples, the first wireless device may sense a channel condition (e.g., a reference signal received power (RSRP) over the first set of resources and may determine that resources reserved by the control channel transmission are available for transmission of a message (e.g., a shared channel transmission) if the channel condition satisfies a threshold (e.g., if the RSRP is below a threshold value). For instance, the first wireless device may determine that a first subset of the second set of resources are unavailable for transmission of the message based on each resource of a first subset of the first set of resources having an associated RSRP above a threshold value and may determine that a second subset of the second set of resources are available for transmission of the message based on each resource of a second subset of the first set of resources having an associated RSRP below a threshold value. Each resource of the first subset of the second set of resources may have an unavailable occupancy state and each resource of the second subset of the second set of resources may have an available or free occupancy state. After identifying the second subset of the second set of resources, the first wireless device may select one or more resources from the second set of resources and may transmit the message over the selected one or more resources (e.g., to a third wireless device). In other examples, the first wireless device may refrain from sensing the first set of resources and may randomly select the one or more resources among the entirety of the second set of resources.

In some examples, performing channel sensing and then selecting resources for transmitting may be associated with a greater latency than selecting resources without first performing channel sensing. However, refraining from performing channel sensing before selecting resources may be associated with a greater likelihood that a collision may occur. Additionally, performing channel sensing over a portion of the first set of resources and refraining from performing channel sensing over the remaining portion of the first set of resources may be associated with decreased latency as compared to performing channel sensing over each of the first set of resources and decreased likelihood of collision occurrence as compared to refraining from sensing any resource of the first set of resources before performing selecting. Sensing over each of the first set of resources may be referred to as full sensing, sensing over a portion of the first set of resources may be referred to as partial sensing, and refraining from sensing any of the first set of resources may be referred to as no sensing.

The present disclosure may describe techniques that may enable the first wireless device to determine whether to perform full sensing, partial sensing, or no sensing based on feedback from previous occurrences in which the first wireless device determined whether to perform full sensing, partial sensing, or no sensing. For instance, the first wireless device may select a sensing state from a set of sensing states. A sensing state may, for instance, indicate which of the first set of resources the first wireless device is to sense and which the first wireless device is to refrain from sensing. Each sensing state may have an associated weight (e.g., probability) with which the first wireless device may select the sensing state. After selecting the sensing state, the first wireless device may perform sensing over the resources of the first set of resources indicated by the sensing state for sensing and may determine which resources of the first set of resources map to resources of the second set of resources with an available channel occupancy state. Additionally, for the resources of the first set of resources indicated by the sensing state for not sensing, the first wireless device may identify a predetermined occupancy state (e.g., an available occupancy state, an unavailable occupancy state, or either according to a weight or probability) for the resources of the second set of resources to which these resources of the first set map. The first wireless device may select one or more resources from among the resources of the second set with the available channel occupancy state. After selecting the one or more resources, the first wireless device may transmit the message over the selected one or more resources. The first wireless device may adjust the weights associated with the sensing states based on whether or not collisions occur over the selected one or more resources. By adjusting the weights, the first wireless device may be more likely to select a sensing state with reduced likelihood of collisions and reduced latency as compared to other sensing states of the set of sensing states. Accordingly, the efficiency of wireless communications may increase.

Aspects of the disclosure are initially described in the context of wireless communications systems. Additional aspects of the disclosure are further described in the context of a decision process scheme and a process flow. Aspects of the disclosure are further illustrated by and described with reference to apparatus diagrams, system diagrams, and flow-charts that relate to weighted decision process-based resource sensing.

FIG. 1 illustrates an example of a wireless communications system 100 that supports weighted decision process-based resource sensing in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to a base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

NR sidelink may support two or more modes of operation. For instance, NR sidelink may support a first mode (e.g., Mode 1) in which a base station 105 may allocate resources for sidelink communications between UEs 115 (e.g., the base station 105 may transmit a resource grant to one of the UEs 115). Additionally, NR sidelink may support a second mode (e.g., Mode 2) in which UEs 115 may autonomously select sidelink resources. Signaling at a receiving UE 115 on sidelink may be the same or similar in the first mode and the second mode. Additionally, sidelink may support HARQ-based retransmission.

In some examples, sidelink communications may occur in transmission or reception resource pools. A resource allocation unit in the resource pool may be a sub-channel in frequency and a slot, sub-slot, or symbol in time. Some slots may be unavailable for sidelink communications (e.g., may be allocated for other types of communications). Additionally, some slots may include feedback resources (e.g., resources for conveying feedback information, such as HARQ acknowledgement (ACK) feedback or HARQ NACK feedback). In some examples, a radio resource control (RRC) configuration for the resource pools may be preconfigured (e.g., pre-loaded on a UE 115) or configured (e.g., from a base station 105 or another UE 115).

A first wireless device (e.g., a UE 115 or a base station 105) may receive a control channel transmission (e.g., SCI, DCI, UCI) from a second wireless device (e.g., a UE 115 or a base station 105). In some examples, the first wireless device may receive the control channel transmission over a first set of resources in a sensing window, where the control channel transmission may indicate a second set of resources in a resource selection window. For instance, each resource of the first set of resources may map to a respective one or more resources of the second set of resources. In some examples, the first wireless device may sense a channel condition (e.g., an RSRP over the first set of resources and may determine that resources reserved by the control channel transmission are available for transmission of a message (e.g., a shared channel transmission) if the channel condition satisfies a threshold (e.g., if the RSRP is below a threshold value). For instance, the first wireless device may determine that a first subset of the second set of resources are unavailable for transmission of the message based on each resource of a first subset of the first set of resources having an associated RSRP above a threshold value and may determine that a second subset of the second set of resources are available for transmission of the message based on each resource of a second subset of the first set of resources having an associated RSRP below a threshold value. Each resource of the first subset of the second set of resources may have an unavailable occupancy state and each resource of the second subset of the second set of resources may have an available or free occupancy state. After identifying the second subset of the second set of resources, the first wireless device may select one or more resources from the second set of resources and may transmit the message over the selected one or more resources (e.g., to a third wireless device). In other examples, the first wireless device may refrain from sensing the first set of resources and may randomly select the one or more resources among the entirety of the second set of resources.

In some examples, performing channel sensing and then selecting resources for transmitting may be associated with a greater latency than selecting resources without first performing channel sensing. However, refraining from performing channel sensing before selecting resources may be associated with a greater likelihood that a collision may occur. Additionally, performing channel sensing over a portion of the first set of resources and refraining from performing channel sensing over the remaining portion of the first set of resources may be associated with decreased latency as compared to performing channel sensing over each of the first set of resources and decreased likelihood of collision occurrence as compared to refraining from sensing any resource of the first set of resources before performing selecting. Sensing over each of the first set of resources may be referred to as full sensing, sensing over a portion of the first set of resources may be referred to as partial sensing, and refraining from sensing any of the first set of resources may be referred to as no sensing.

The present disclosure may describe techniques that may enable the first wireless device to determine whether to perform full sensing, partial sensing, or no sensing based on feedback from previous occurrences in which the first wireless device determined whether to perform full sensing, partial sensing, or no sensing. For instance, the first wireless device may select a sensing state from a set of sensing states. A sensing state may, for instance, indicate which of the first set of resources the first wireless device is to sense and which the first wireless device is to refrain from sensing. Each sensing state may have an associated weight (e.g., probability) with which the first wireless device may select the sensing state. After selecting the sensing state, the first wireless device may perform sensing over the resources of the first set of resources indicated by the sensing state for sensing and may determine which resources of the first set of resources map to resources of the second set of resources with an available channel occupancy state. Additionally, for the resources of the first set of resources indicated by the sensing state for not sensing, the first wireless device may identify a predetermined occupancy state (e.g., an available occupancy state, an unavailable occupancy state, or either according to a weight or probability) for the resources of the second set of resources to which these resources of the first set map. The first wireless device may select one or more resources from among the resources of the second set with the available channel occupancy state. After selecting the one or more resources, the first wireless device may transmit the message over the selected one or more resources. The first wireless device may adjust the weights associated with the sensing states based on whether or not collisions occur over the selected one or more resources. By adjusting the weights, the first wireless device may be more likely to select a sensing state with reduced likelihood of collisions and reduced latency as compared to other sensing states of the set of sensing states. Accordingly, the efficiency of wireless communications may increase.

FIG. 2 illustrates an example of a wireless communications system 200 that supports weighted decision process-based resource sensing in accordance with aspects of the present disclosure. In some examples, wireless communications system 200 may implement one or more aspects of wireless communications system 100. For instance, first wireless device 205-*a*, second wireless device 205-*b*, and third wireless device 205-*c* may each be an example of a UE 115 or a base station 105 as described with reference to FIG. 1.

In some examples, first wireless device 205-*a* may receive a control channel transmission 210 (e.g., SCI, DCI, UCI) from second wireless device 205-*b*. First wireless device 205-*a* may receive the control channel transmission 210 over a first set of resources in a sensing window 220. For instance, first wireless device 205-*a* may receive control channel transmission 210 over one or more of resources 230-*a*, 230-*b*, and 235 of sensing window 220. In some examples, some or each resource of the first set of resources may map to a second set of resources in a resource selection window 225. For instance, resource 230-*a* in sensing window 220 may map to resources 240 in the resource selection window 225 with a free occupancy state, resource 230-b in sensing window 220 may map to resources 245 in the resource selection window 225 with a busy occupancy state, and resource 235 may map to resources 250 in the resource selection window 225 with a predetermined occupancy state.

In some examples, first wireless device 205-a may determine whether a resource in resource selection window 225 is available based on decoding the control channel transmission 210 in one or more resources of the resource selection window 225 For instance, first wireless device 205-a may measure an RSRP in the one or more resources and may project the RSRP of the transmission within each resource onto the resource selection window 225. For instance, wireless device 205-a may project the RSRP of resource 230-a onto resources 240, the RSRP of resource 230-b onto resources 245, the RSRP of resource 235 onto resources 250, or any combination thereof. RSRP may be measured on a control channel (e.g., physical sidelink control channel (PSCCH), physical uplink control channel (PUCCH), physical downlink control channel (PDCCH)) or a shared channel demodulation reference signal (DMRS) (e.g., physical sidelink shared channel (PSSCH), physical downlink shared channel (PDSCH), physical uplink shared channel (PUSCH)) according to a configured or pre-configured parameter or set of parameters. Additionally, the length of the sensing window 220 (e.g., where the control channel transmission 210 is decoded) may be configured or preconfigured. Each reservation may have a priority indicated in control channel transmission 210 that is tracked as part of sensing.

Resources that have an RSRP below a threshold amount may be considered available resources 240 (e.g., resources with a free occupancy state). For instance, resource 230-a may have an RSRP below the threshold amount. Accordingly, the resources of resource selection window 225 that resource 230-a projects onto (e.g., resources 240) may be available and may have a free occupancy state. Resources that have an RSRP above the threshold amount may be considered unavailable resources 245 (e.g., resources with a busy channel occupancy state). For instance, resource 230-b may have an RSRP above the threshold amount. Accordingly, the resources of resource selection window 225 that resource 230-b projects onto (e.g., resources 245) may be unavailable and may have a busy occupancy state. Although each available resource 240 and each unavailable resource 245 depicted are associated with a respective one resource of sensing window 220, there may be examples, in which additional available resources 240 and/or unavailable resources 245 are present that map to other resources of sensing window 220.

In some examples, the RSRP threshold (e.g., an RSRP comparison threshold) may be configured or pre-configured per transmitter priority and receiver priority pair. If a proportion of available resources in resource selection window 225 is less than a certain percentage of total resources (e.g., total resources associated with a respective sensed resource in sensing window 220, total resources of resource selection window 225), the RSRP threshold may be increased and the process of sensing and selecting resources may begin again. Available resources 240 in the selection window may form a candidate resource set, where the candidate resource set may be reported to higher layers. Resources may be selected such that each retransmission of a packet may occur within its packet delay budget (PDB).

In some examples, resource selection may occur according to a timeline. For instance, a first time duration $T_0$ may be configured or pre-configured between a start of sensing window 220 and a resource selection trigger. The time between an end of sensing window 220 to the resource selection trigger may be defined as $T_{proc,0}$. Additionally, first wireless device 205-a may determine a time duration $T_1$ between the resource selection trigger and a start of resource selection window 225. In some examples, $T_1$ may be greater than 0 and less than a configured or pre-configured time duration $T_{proc,1}$. A time duration between the resource selection trigger and the end of resource selection window 225 may be defined as $T_2$. $T_2$ may be less than a remaining PDB from the resource selection trigger and greater than $T_{2,min}$, which may be a preconfigured time duration per priority. First wireless device 205-a may confirm resource availability at least a time $T_3$ before transmitting over the resource in resource selection window 225.

In some examples, first wireless device 205-a may perform an availability check based on the RSRP level measured on a control channel or a shared channel DMRS according to a pre-configuration. In some examples, the RSRP comparison threshold may be configured or pre-configured per transmitter priority and receiver priority pair. In some examples, first wireless device 205-a may attempt to transmit a new packet to second wireless device 205-b. First wireless device 205-a may have already sensed previous resources and successfully decoded control information from two other transmitting wireless devices. Accordingly, when first wireless device 205-a attempts to reserve resources, first wireless device 205-a may check an availability of resources reserved by the two other transmitting wireless devices. In some such examples, first wireless device 205-a may check that an RSRP of a first resource that one of the or both of the other wireless devices transmit in is less than a threshold determined based on a first priority associated with first wireless device 205-a and a second priority associated with second wireless device 205-b. If the observed RSRP is lower than the threshold, first wireless device 205-a may determine the first resource is available for reservation.

After identifying each available resource 240 and each unavailable resource 245 in resource selection window 225, first wireless device 205-a may transmit a report of availability. The report of availability may indicate availability values for each of the resources. The indications of availability may be binary (e.g., available, not available), or may, in some examples, in addition to indicating whether resources are available, schedule resources for second wireless device 205-b. In some examples, the behavior of first wireless device 205-a may be undefined in selecting available resources if the total quantity of available resources is below a threshold value according to a selected signal to interference ratio (SIR). Additionally, the behavior of first wireless device 205-a may be undefined when available resources have different estimated SIR levels.

In some examples first wireless device 205-a performing sensing over each resource of a set of resources configured for receiving control channel transmission 210 may be referred to as full-sensing. Additionally, first wireless device 205-a refraining from performing sensing over any resource of the set of resources may be referred to as no sensing. Additionally, first wireless device 205-a performing sensing over a first subset of the set of resources and refraining from performing sensing over a second subset of the set of resources may be referred to as partial-sensing. Resources that first wireless device 205-a senses (e.g., each resource in full-sensing or the first subset in partial sensing) may have a free channel occupancy state or busy channel occupancy state determined based on the sensing, whereas resources that first wireless device 205-*a* refrains from sensing may have a predetermined channel occupancy state (e.g., free channel occupancy state, busy channel occupancy state, or either channel occupancy state with a predefined probability). In the present example, first wireless device 205-*a* may perform partial sensing, in which first wireless device 205-*a* performs channel sensing over resources 230-*a* and 230-*b* and may refrain from performing channel sensing over resource 235. Based on performing the channel sensing over resource 230-*a*, first wireless device 205-*a* may determine that resources 240 have a free or available occupancy state (e.g., due to an RSRP of resource 230-*a* being below a threshold) and that resources 245 have a busy channel occupancy state (e.g., due to an RSRP of resource 230-*b* being above the threshold). Additionally, first wireless device 205-*a* may determine a predetermined channel occupancy state for resources 250 based on refraining from performing channel sensing for resource 235 of sensing window 220.

In some examples, whether first wireless device 205-*a* performs channel sensing for a resource of sensing window 220 may impact a performance of first wireless device 205-*a*. For instance, performing channel sensing and then selecting resources for transmitting in full-sensing may be associated with a greater latency than selecting resources without first performing channel sensing in no-sensing. However, refraining from performing channel sensing before selecting resources in no sensing may be associated with a greater likelihood that a collision may occur than full-sensing. Additionally, performing channel sensing over a first subset of a set of resources and refraining from performing channel sensing over the remaining portion of the set of resources in partial sensing may be associated with decreased latency as compared to performing channel sensing over each of the first set of resources in full-sensing and decreased likelihood of collision occurrence as compared to refraining from sensing any resource of the first set of resources before performing selecting in no sensing.

The amount by which performing full-sensing, partial-sensing, or no sensing impacts the performance of first wireless device 205-*a* (e.g., impacts the latency and/or the number of collisions that occur) may vary (e.g., according to a duration of sensing window 220, a channel busy ratio (CBR), a transport block size (TBS), or any combination thereof). Accordingly, having an adaptive combination between full-sensing, partial sensing, and no sensing (e.g., with random selection of resources of resource selection window 225) based on one or more parameters may enable first wireless device 205-*a* to adjust to changing conditions associated with first wireless device 205-*a* (e.g., a change in channel conditions measured by first wireless device 205-*a*). Performing such adjustments may improve performance and conserve additional power at first wireless device 205-*a*.

In one example, first wireless device 205-*a* may select a sensing state from a set of sensing states. A sensing state may, for instance, indicate which resources of sensing window 220 the first wireless device 205-*a* is to sense (e.g., resources 230-*a* and 230-*b*) and which the first wireless device 205-*a* is to refrain from sensing (e.g., resource 235). Each sensing state may have an associated weight (e.g., probability) with which the first wireless device 205-*a* may select the sensing state. After selecting the sensing state, the first wireless device 205-*a* may perform sensing over the resources of the sensing window 220 indicated by the sense state for sensing (e.g., resources 230-*a* and 230-*b*) and may determine which resources of the sensing window 220 map to resources of resource selection window 225 with an available channel occupancy state. For instance, in the present example, first wireless device 205-*a* may sense resource 230-*a* and may determine that resources 240 are available based on the sensing. Similarly, in the present examples, first wireless device 205-*a* may sense resource 230-*b* and may determine that resources 245 are unavailable based on the sensing. Additionally, for the resources of sensing window 220 by the sense state for not sensing, first wireless device 205-*a* may identify a predetermined occupancy state (e.g., an available occupancy state, an unavailable occupancy state, or either according to a weight or probability) for the resources of the resource selection window 225 to which these resources of the sensing window 220 map. For instance, first wireless device 205-*a* may determine a predetermined occupancy state (e.g., available occupancy state, unavailable occupancy state, either occupancy state with a probability) for resources 250 to which resource 235 of sensing window 220 maps.

After determining which resources have an available occupancy state, first wireless device 205-*a* may select one or more resources from among the resources of resource selection window 225 that are available (e.g., resources 240 and any resources 250 that have an available occupancy state). After selecting the one or more resources, the first wireless device 205-*a* may transmit a message 215 (e.g., a shared channel transmission) over the selected one or more resources (e.g., to third wireless device 205-*c*). First wireless device 205-*a* may adjust the weights associated with the sensing state based on whether or not collisions occur over the selected one or more resources. By adjusting the weights, the first wireless device 205-*a* may be more likely to select a sensing state with reduced likelihood of collisions and reduced latency as compared to other sensing states of the set of sensing states. Accordingly, the efficiency of wireless communications may increase. In some examples, first wireless device 205-*a* may select the sensing state and adjust the weights using a Markov Decision Process (MDP). Additionally details may be described herein, for instance, with reference to FIG. 3.

In some examples, first wireless device 205-*a* may divide each slot of a set of slots into resources. For instance, first wireless device 205-*a* may determine that there are N resources to sense, where each resource may include X sub-channels, where X may be greater than or equal to 1. First wireless device 205-*a* may construct $2^N$ sensing states (e.g., channel sensing outcome states) from the N resources (e.g., N resources of sensing window 220), where the outcome of the sensing states may include sensing a respective resource of the N resources or refraining from sensing the respective resource. First wireless device 205-*a* may select a resource by random selection and/or by performing sensing. How wireless device 205-*a* selects the resource may depend on a policy obtained through observation of wireless device 205-*a* or through collaboration among multiple wireless devices. In some examples, the size of resources and number of resources subject to an MDP may be inter-coordinated among wireless devices (e.g., via RRC signaling, medium access control (MAC) control element signaling, or shared channel signaling, such as PSSCH signaling). One of the wireless devices among coordinated wireless devices (e.g., elected by a base station or by the wireless devices) may act as a controlling device. Additionally or alternatively, the controlling device may be a programmable logic controller (PLC) or primary UE selected by a base station. A base station may configure an MDP at the wireless devices per resource pool and may define N and resource sizes for the wireless devices.

In a first example of an MDP, first wireless device 205-a may assign a weight to each sensing state. For instance, first wireless device 205-a may assign a probability p(R1, R2, R3, . . . RN) to each sensing state (R1, R2, R3, . . . RN) of $2^N$ sensing states, where $R_i$=1 if first wireless device 205-a senses the ith resource and $R_i$=0 if first wireless device 205-a does not sense the ith resource. Accordingly, $2^N$ weights (e.g., probabilities) may be assigned to $2^N$ sensing states. For state (0, 1, 1, 0), for instance, where N=4, p(0, 1, 1, 0) may be equal to 0.1. The sum of p(R1, R2, R3, . . . RN) across each sensing state of the sensing states may equal 1. In some examples, first wireless device 205-a may divide total available resources (e.g., for sensing window 220) into N resources at least in part using a TBS for data of first wireless device 205-a and a modulation and coding scheme (MCS). In some such examples, a resource block (RB) allocation (e.g., a size of resources to be sensed) may be determined based on TBS and/or MCS (e.g., one or more resources may be used to send a TBS). In some examples, p(R1, R2, R3, . . . RN) may be a function based on a transmission priority, a quality of service (QoS), a resource utilization condition, or any combination thereof. The resource utilization conditions may include a CBR, a channel occupancy ratio (CR), a battery status of wireless device 205-a, or any combination thereof. If the CBR is above a threshold, p(1, 1, 1, . . . 1)=1 (e.g., each resource may be sensed). The sensing state may be part of the MDP, as an event (e.g., sensing or not sensing) may be defined according to the weights described herein.

After wireless device 205-a determines the sensing state (e.g., the event), wireless device 205-a may sense over corresponding resources indicated by the sensing state and perform an occupancy state decision for the N resources. For instance, wireless device 205-a may determine a predetermined occupancy state for resources of resource selection window 225 that map to resources of sensing window 220 indicated by the sensing state to be unsensed and may determine an available or unavailable occupancy state for the remaining resources of resource selection window 225. A base station or a controlling device (e.g., a primary UE, a controlling UE, a PLC) may configure wireless devices to determine that unsensed resources of sensing window 220 map to resources with a free or available occupancy state, resources with an unavailable occupancy state, or resources that are free with a probability p (e.g., where p is pre-configured). This configuration may be performed per resource pool and/or per RRC or MAC-CE configuration. In some examples, an MDP may be defined as a function of occupancy states.

In some examples, wireless device 205-a may send an indication (e.g., a signal) to a base station or another wireless device (e.g., wireless device 205-b) to start training online or offline. The mode (e.g., an on mode or an off mode) may be configured or signaled per rendezvous point (RP) (e.g., by a base station), between wireless devices, or by a controlling device (e.g., a controlling UE, a PLC, a primary UE). The base station or controlling device may start the training process. In some examples, first wireless device 205-a may signal states and optimal policies with other wireless devices or the network (e.g., between inter-coordinated wireless devices). Such signaling may enable other wireless devices to formulate MDPs and solutions for the MDPs. In some examples, the MDP, per wireless device, may be constructed based on a state observation of the wireless device 205-a as well as observations of other wireless devices. For instance, each wireless device (e.g., including wireless device 205-a) may construct a super state based on collected sensing states. In some examples, a policy solution (e.g., a best policy solution) may be attained using reinforcement learning techniques such as value iteration, Q-learning, or policy iterations.

In some examples, adapting (e.g., adjusting) weights for selecting the sensing state may be associated with one or more advantages. For instance, if wireless device 205-a determines that a first one or more resources of sensing window 220 are more likely to experience a collision than a second one or more resources of sensing window 220, wireless device 205-a may adjust the weight such that wireless device 205-a is more likely to select a sensing state in which the first one or more resources are sensed and the second one or more resources are not sensed. Thus, wireless device 205-a may decrease a likelihood of collision in the first one or more resources, but may also decrease a latency associated with the sensing the one or more second resources. Accordingly, the efficiency of wireless communications many increase.

Figure 3:
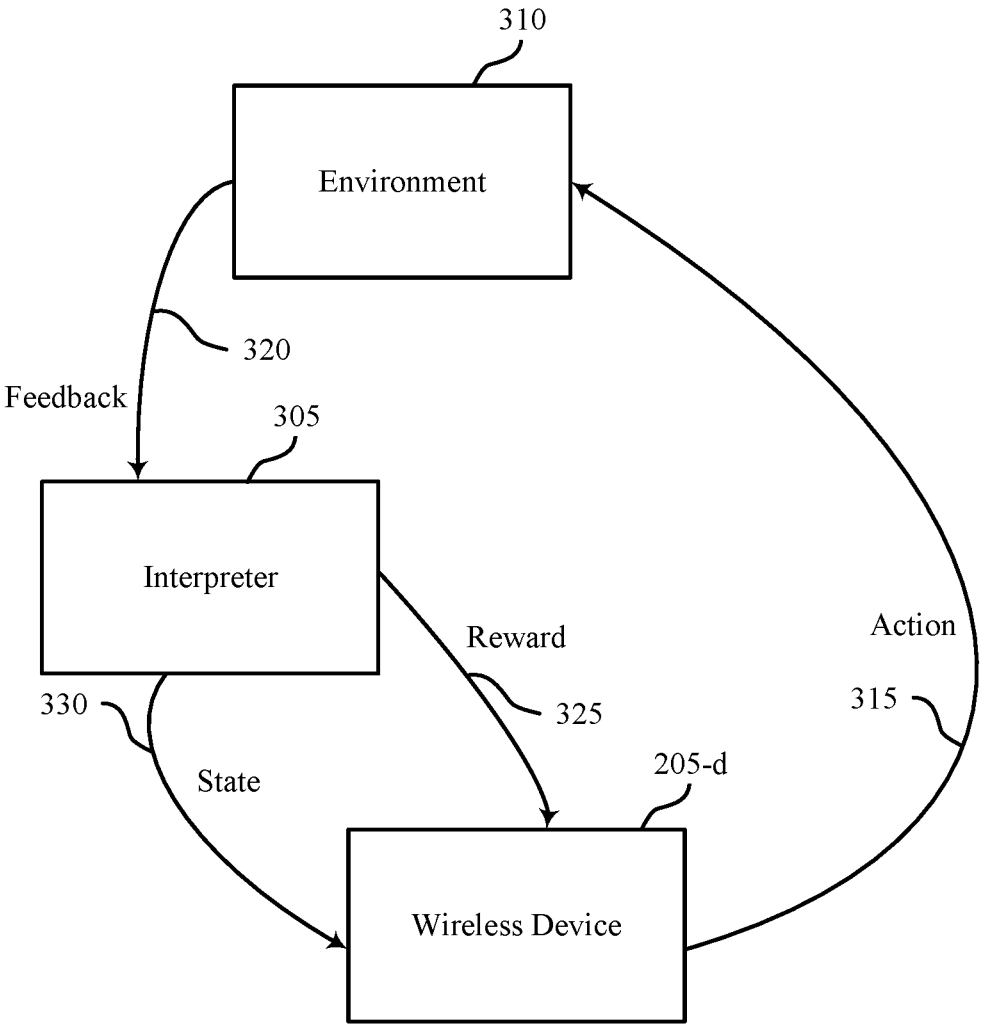
FIG. 3 illustrates an example of a decision process scheme that supports weighted decision process-based resource sensing in accordance with aspects of the present disclosure.

FIG. 3 illustrates an example of a decision process scheme 300 that supports weighted decision process-based resource sensing in accordance with aspects of the present disclosure. In some examples, decision process scheme 300 may be implemented by one or more aspects of wireless communications systems 100 and 200. For instance, wireless device 205-d may be an example of a UE 115 as described with reference to FIG. 1, a base station 105 as described with reference to FIG. 1, or a wireless device 205-a as described with reference to FIG. 2. In some examples, decision process scheme 300 may represent a decision process performed by a wireless device to select states and to adjust weights, as described herein (e.g., with reference to FIG. 2).

Interpreter 305 may be a component of wireless device 205-d that receives and interprets feedback 320 from the environment 310. Environment 310 may, for instance, represent one or more aspects of a channel that wireless device 205-d communicates in. In some examples, environment 310 may receive an indication of an action 315 from wireless device 205-d and wireless device 205-d may receive a state 330 (e.g., a sensing state) and/or a reward 325 from interpreter 305.

For each state 330 (e.g., sensing state) determined by wireless device 205-d, there may be an associated action 315 in terms of the usage of N resources. For instance, the action may be to sense one or more of the N resources or to refrain from sensing the one or more of the N resources. Decision process scheme 300 may account for the effects of a channel and physical correlation among resources. Additionally, decision process scheme 300 may account for examples in which resources may be used jointly and/or for examples in which it may be desirable to sense over some resources as compared to others. The action 315 (e.g., policy) for each state 330 may include accessing (e.g., using) or not accessing (not using) of resources defined as $(a_1, a_2, a_3, . . . a_N)$, where $a_1$ may be defined per resource and may be a binary value corresponding to a respective resource being accessed (e.g., used) or not. The reward function used to generate reward 325 may generate a higher value for wireless device 205-d (e.g., a higher reward 325) when no collisions take place (e.g., a resource indicated as available actually is available), and a lower value (e.g., a negative value) when a collision does occur (e.g., a resource indicated as available is not actually available).

Figure 4:
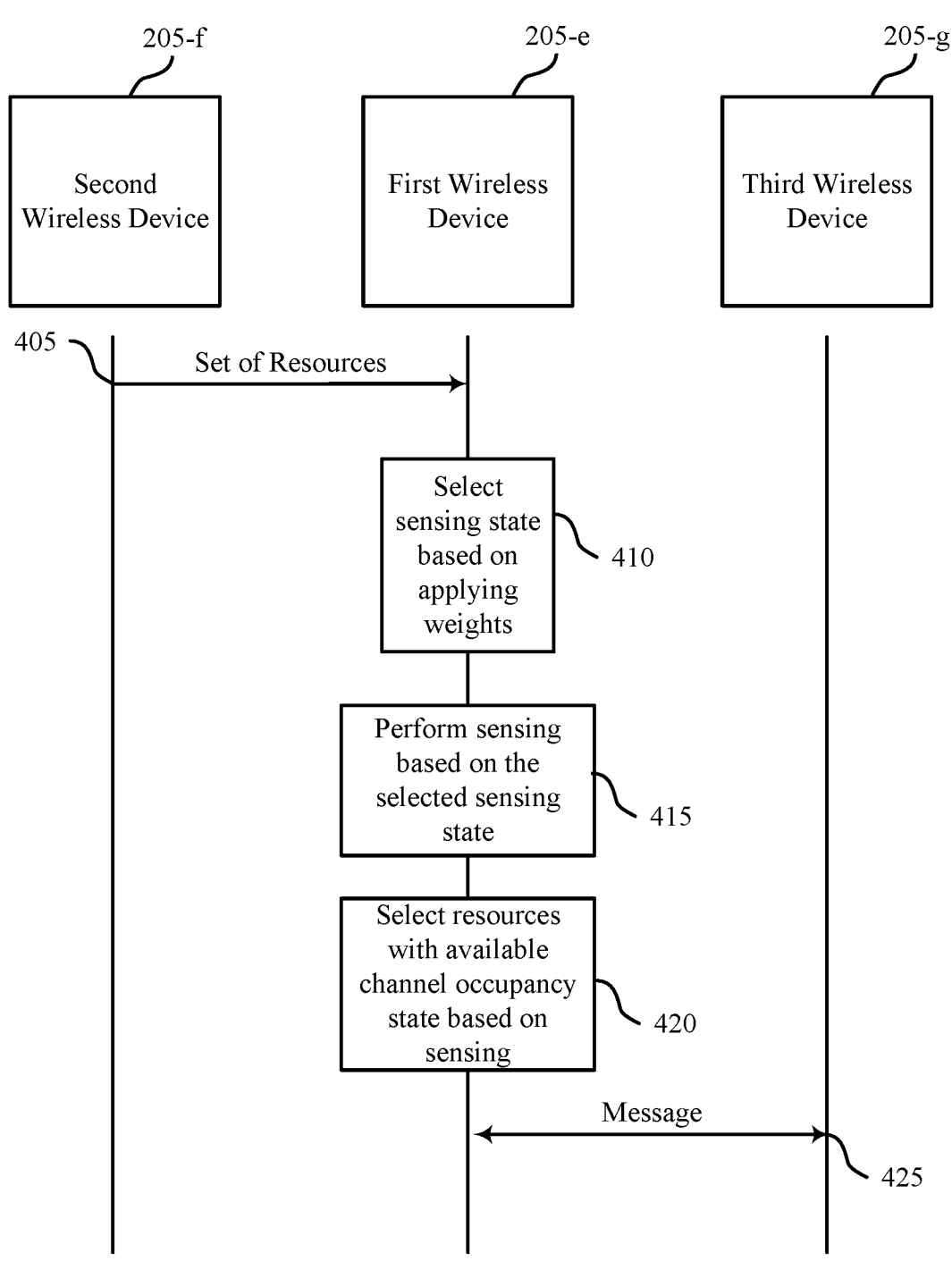
FIG. 4 illustrates an example of a process flow that supports weighted decision process-based resource sensing in accordance with aspects of the present disclosure.

FIG. 4 illustrates an example of a process flow 400 that supports weighted decision process-based resource sensing in accordance with aspects of the present disclosure. In some examples, process flow 400 may be implemented by one or more aspects of wireless communications systems 100 and/ or 200. For instance, first wireless device 205-e, second wireless device 205-f, and third wireless device 205-g may each be an example of a UE 115 as described with reference to FIG. 1, a base station 105 as described with reference to FIG. 1, a first wireless device 205-a as described with reference to FIG. 2, a second wireless device 205-b as described with reference to FIG. 2, or any combination thereof.

At 405, second wireless device 205-f may transmit, to first wireless device 205-e, an indication of a set of resources associated with weighted selection of resource sensing. In some examples, second wireless device 205-f may transmit, to first wireless device 205-e, signaling indicating a quantity of resources in the set of resources, a quantity of resource blocks that a resource of the set of resources includes, or any combination thereof. The signaling may include RRC signaling, MAC-CE signaling, or a sidelink shared channel transmission (e.g., a PSSCH transmission). In some examples, first wireless device 205-e may receive an indication (e.g., to second wireless device 205-f) an indication to initiate a training process for the weighted selection of resource sensing for the set of resources at first wireless device 205-e. Additionally, first wireless device 205-e may transmit an indication of a result of the training process for the weighted selection of resource sensing for the set of resources. In some examples, first wireless device 205-e may determine a quantity of resources of the set of resources based on a TBS for the message, a MCS associated with the message, or both.

At 410, first wireless device 205-e may select a sensing state of a set of sensing states for the set of resources based on applying a respective weight to each sensing state of the set of sensing states, where a first weight of a first sensing state of the set of sensing states is different than a second weight of a second sensing state of the set of sensing states. In some examples, selecting the sensing state may be based on receiving the indication to initiate the training process. In some examples, first wireless device 205-e may receive, from second wireless device 205-f, an indication of a configuration of the weighted selection of resource sensing for the set of resources, where selecting the sensing state may be based on receiving the indication of the configuration. In some examples, first wireless device 205-e may transmit an indication of the selected sensing state. In some examples, the respective weight of each state of the set of states is based on a CBR, a CR, a transmission priority, a QoS, a batter status of first wireless device 205-e, or any combination thereof.

At 415, first wireless device 205-e may perform sensing over a first subset of the set of resources based on the selected sensing state.

At 420, first wireless device 205-e may select one or more resources of a resource selection window with an available channel occupancy state that is determined based on performing the sensing. For instance, the selected one or more resources of the resource selection window may include resources of the resource selection window associated with the first subset of the set of resources for which sensing indicated an available channel occupancy state. Additionally or alternatively, the selected one or more resources of the resource selection window may include resources of a second subset of the set of resources for which the resources have a predetermined occupancy state and in which the predetermined occupancy state indicates an available occupancy state. In some examples, first wireless device 205-e may receive, from second wireless device 205-f, an indication of the predetermined occupancy state. In some examples, the indication of the predetermined occupancy state may be provided via RRC signaling or MAC-CE signaling. In some examples, the predetermined occupancy state indicates that each resource of a second set of resources to which the second subset of the set of resources map (e.g., resources of a resource selection window) has an available channel occupancy state, an unavailable channel occupancy state, or a selectively available channel occupancy state according to a value of a parameter (e.g., a parameter indicating a probability). In some examples, performing occupancy state determinations for the first subset of the set of resources is based on a SIR, an RSRP, or both for resources of the first subset of the set of resources.

At 425, first wireless device 205-e may communicate a message with third wireless device 205-g based on respective occupancy state determinations for the set of resources. For instance, first wireless device 205-e may communicate the message with third wireless device 205-g via resources determined to have an available channel occupancy state via sensing (e.g., resources associated with the first subset) or via a predetermined occupancy state (e.g., resources associated with the second subset).

In some examples, first wireless device 205-e may receive an indication of a third sensing state for the set of resources (e.g., a third sensing state associated with another wireless device) and a result associated with the third sensing state (e.g., an indication of whether a collision occurred or not). In such examples, first wireless device 205-e may adapt the respective weights of the sensing states based on receiving the indication of the third sensing state and the result associated with the third sensing state.

In some examples, first wireless device 205-e may determine that a collision has occurred over at least one resource associated with the first subset of the set of resources. In such examples, first wireless device 205-e may adjust the respective weight of the selected sensing state based on determining that the collision has occurred. Additionally or alternatively, first wireless device 205-e may determine that CBR satisfies a threshold. In such examples, first wireless device 205-e may adjust the first weight of the first sensing state to a non-zero value and the respective weight for each other sensing state of the set of sensing states to a zero value based on determining that the CBR satisfies the threshold.

Figure 5:
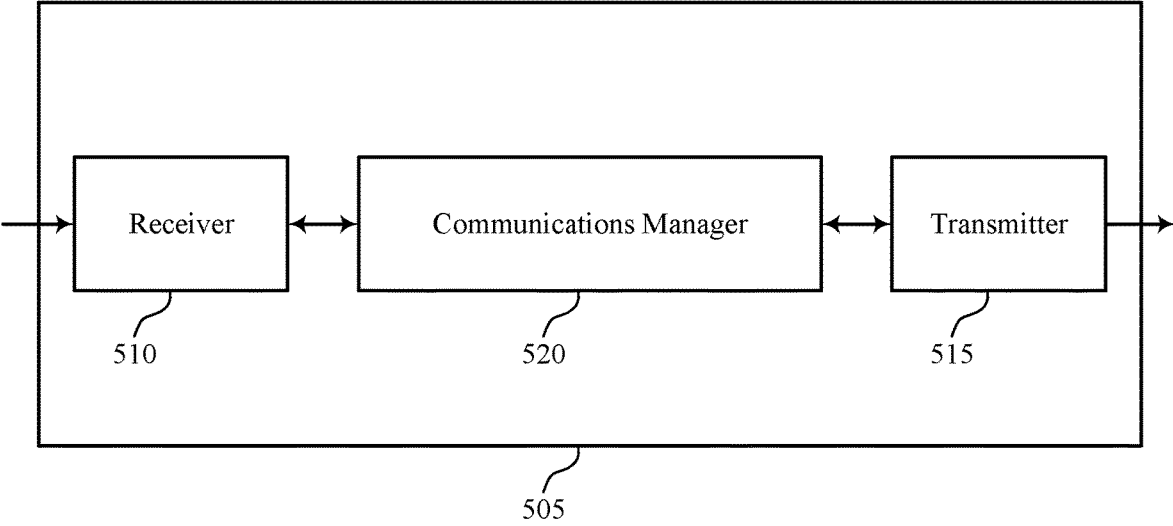
FIGS. 5 and 6 show block diagrams of devices that support weighted decision process-based resource sensing in accordance with aspects of the present disclosure.

FIG. 5 shows a block diagram 500 of a device 505 that supports weighted decision process-based resource sensing in accordance with aspects of the present disclosure. The device 505 may be an example of aspects of a wireless device as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to weighted decision process-based resource sensing). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to weighted decision process-based resource sensing). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of weighted decision process-based resource sensing as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an ASIC, a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

Additionally or alternatively, the communications manager 520 may support wireless communication at a first wireless device in accordance with examples as disclosed herein. For example, the communications manager 520 may be configured as or otherwise support a means for receiving, from a second wireless device, an indication of a set of resources associated with weighted selection of resource sensing. The communications manager 520 may be configured as or otherwise support a means for selecting a sensing state of a set of sensing states for the set of resources based on applying a respective weight to each sensing state of the set of sensing states, where a first weight of a first sensing state of the set of sensing states is different than a second weight of a second sensing state of the set of sensing states.

The communications manager 520 may be configured as or otherwise support a means for performing sensing over a first subset of the set of resources based on the selected sensing state. The communications manager 520 may be configured as or otherwise support a means for communicating a message with a third wireless device based on respective occupancy state determinations for the set of resources, where the respective occupancy state determinations for the first subset of the set of resources are based on performing the sensing and the respective occupancy state determinations for a second subset of the set of resources are based on a predetermined occupancy state.

Additionally or alternatively, the communications manager 520 may support wireless communication at a first wireless device in accordance with examples as disclosed herein. For example, the communications manager 520 may be configured as or otherwise support a means for receiving, from a second wireless device, an indication of a set of resources associated with weighted selection of resource sensing. The communications manager 520 may be configured as or otherwise support a means for selecting a sensing state of a set of sensing states for the set of resources based on applying a respective weight to each sensing state of the set of sensing states. The communications manager 520 may be configured as or otherwise support a means for performing sensing over a first subset of the set of resources based on the selected sensing state. The communications manager 520 may be configured as or otherwise support a means for communicating a message with a third wireless device based on respective occupancy state determinations for the set of resources.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for the device 505 to adapt (e.g., adjust) weights such that the device 505 may be more likely to select sensing states associated with sensing resources that have an increased likelihood of collisions and refraining from sensing resources that have a decreased likelihood of collisions. By refraining from sensing the resources with the decreased likelihood of collisions, the device 505 may reduce latency associated with the sensing.

Figure 6:
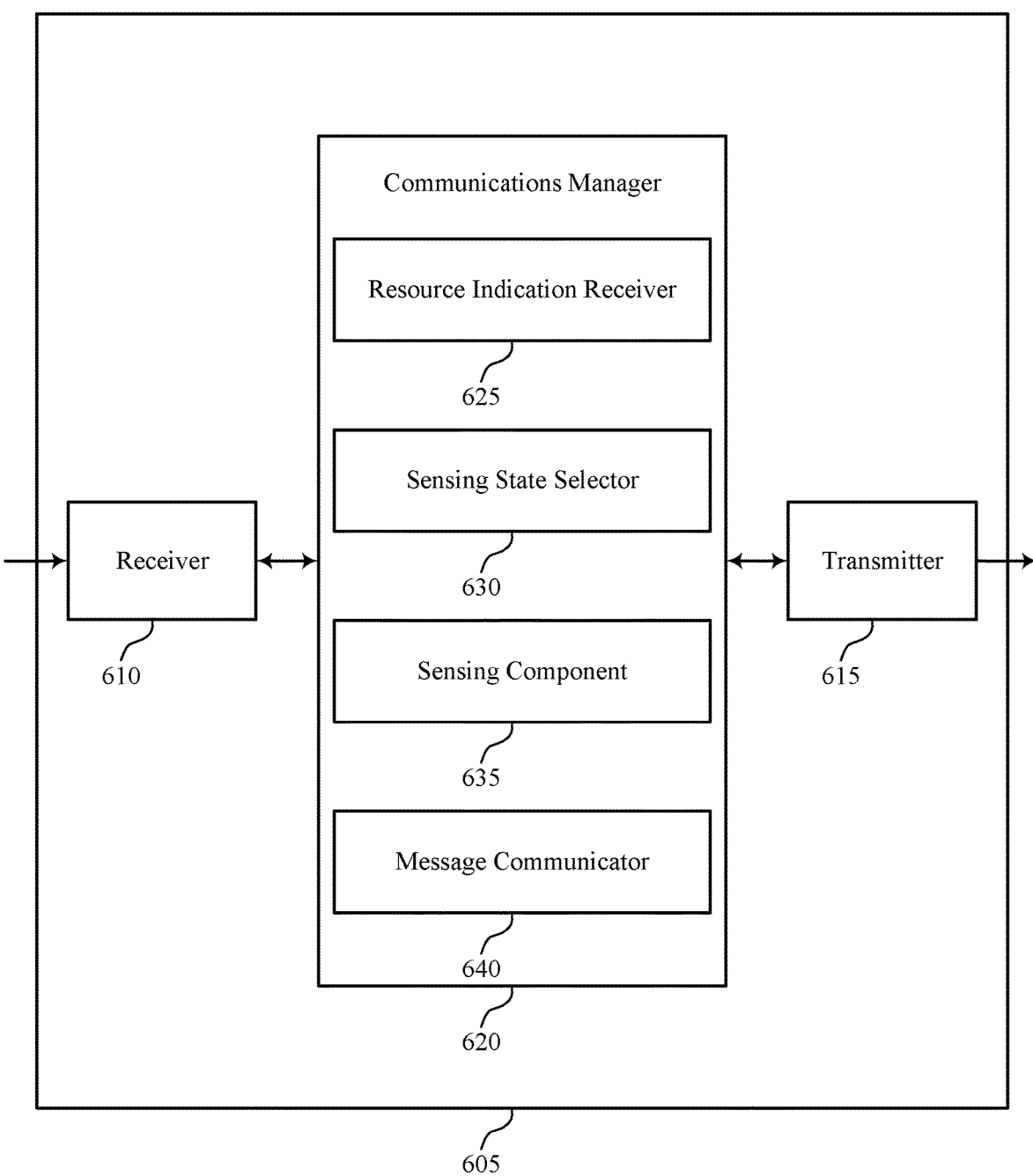

FIG. 6 shows a block diagram 600 of a device 605 that supports weighted decision process-based resource sensing in accordance with aspects of the present disclosure. The device 605 may be an example of aspects of a device 505 or a wireless device as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to weighted decision process-based resource sensing). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to weighted decision process-based resource sensing). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of weighted decision process-based resource sensing as described herein. For example, the communications manager 620 may include a resource indication receiver 625, a sensing state selector 630, a sensing component 635, a message communicator 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first wireless device in accordance with examples as disclosed herein. The resource indication receiver 625 may be configured as or otherwise support a means for receiving, from a second wireless device, an indication of a set of resources associated with weighted selection of resource sensing. The sensing state selector 630 may be configured as or otherwise support a means for selecting a sensing state of a set of sensing states for the set of resources based on applying a respective weight to each sensing state of the set of sensing states, where a first weight of a first sensing state of the set of sensing states is different than a second weight of a second sensing state of the set of sensing states. The sensing component 635 may be configured as or otherwise support a means for performing sensing over a first subset of the set of resources based on the selected sensing state. The message communicator 640 may be configured as or otherwise support a means for communicating a message with a third wireless device based on respective occupancy state determinations for the set of resources, where the respective occupancy state determinations for the first subset of the set of resources are based on performing the sensing and the respective occupancy state determinations for a second subset of the set of resources are based on a predetermined occupancy state.

Additionally or alternatively, the communications manager 620 may support wireless communication at a first wireless device in accordance with examples as disclosed herein. The resource indication receiver 625 may be configured as or otherwise support a means for receiving, from a second wireless device, an indication of a set of resources associated with weighted selection of resource sensing. The sensing state selector 630 may be configured as or otherwise support a means for selecting a sensing state of a set of sensing states for the set of resources based on applying a respective weight to each sensing state of the set of sensing states. The sensing component 635 may be configured as or otherwise support a means for performing sensing over a first subset of the set of resources based on the selected sensing state. The message communicator 640 may be configured as or otherwise support a means for communicating a message with a third wireless device based on respective occupancy state determinations for the set of resources.

Figure 7:
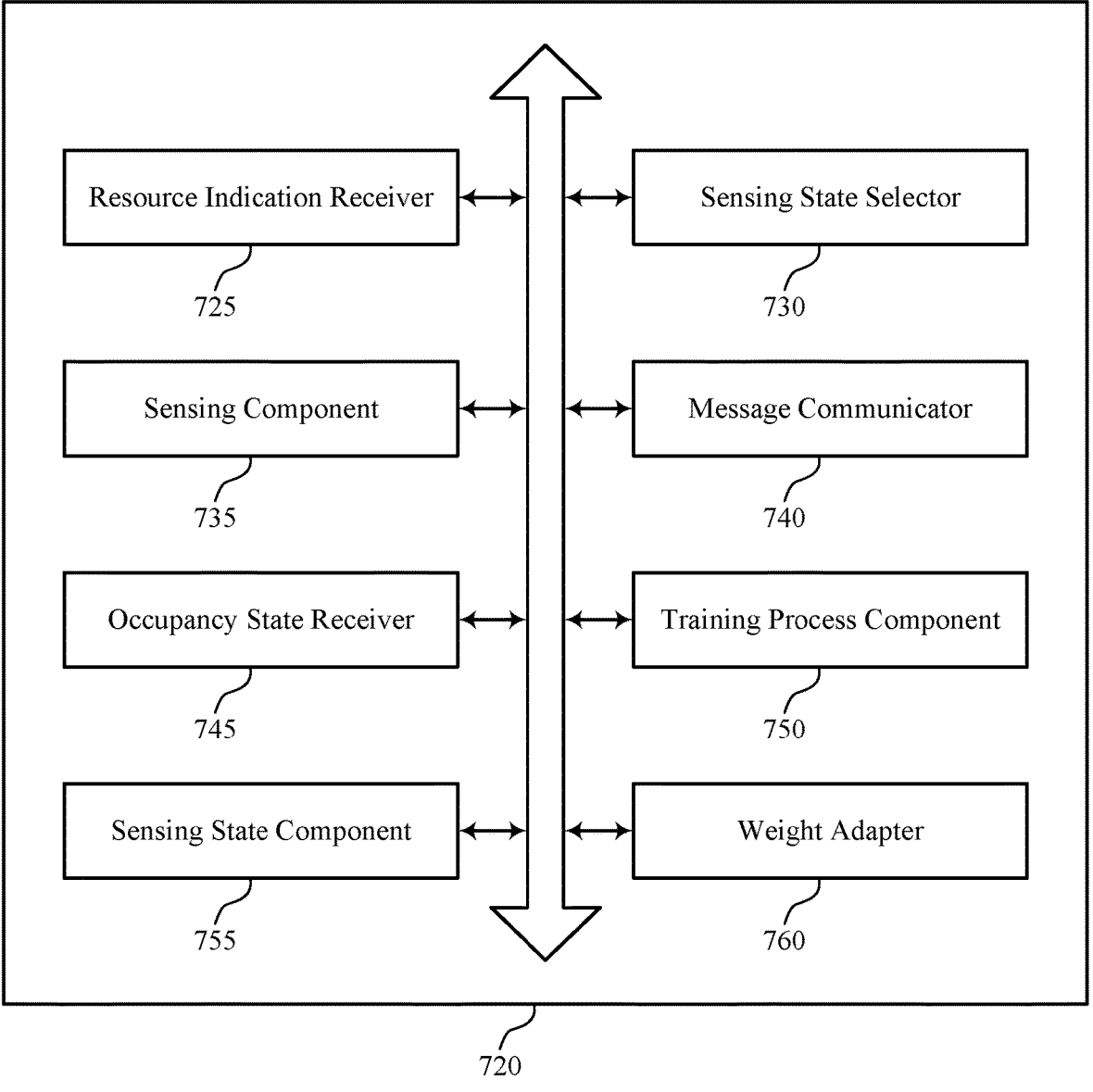
FIG. 7 shows a block diagram of a communications manager that supports weighted decision process-based resource sensing in accordance with aspects of the present disclosure.

FIG. 7 shows a block diagram 700 of a communications manager 720 that supports weighted decision process-based resource sensing in accordance with aspects of the present disclosure. The communications manager 720 may be an example of aspects of a communications manager 520, a communications manager 620, or both, as described herein. The communications manager 720, or various components thereof, may be an example of means for performing various aspects of weighted decision process-based resource sensing as described herein. For example, the communications manager 720 may include a resource indication receiver 725, a sensing state selector 730, a sensing component 735, a message communicator 740, an occupancy state receiver 745, a training process component 750, a sensing state component 755, a weight adapter 760, or any combination thereof. Each of these components may communicate, directly or indirectly, with one another (e.g., via one or more buses).

Additionally or alternatively, the communications manager 720 may support wireless communication at a first wireless device in accordance with examples as disclosed herein. The resource indication receiver 725 may be configured as or otherwise support a means for receiving, from a second wireless device, an indication of a set of resources associated with weighted selection of resource sensing. The sensing state selector 730 may be configured as or otherwise support a means for selecting a sensing state of a set of sensing states for the set of resources based on applying a respective weight to each sensing state of the set of sensing states, where a first weight of a first sensing state of the set of sensing states is different than a second weight of a second sensing state of the set of sensing states. The sensing component 735 may be configured as or otherwise support a means for performing sensing over a first subset of the set of resources based on the selected sensing state. The message communicator 740 may be configured as or otherwise support a means for communicating a message with a third wireless device based on respective occupancy state determinations for the set of resources, where the respective occupancy state determinations for the first subset of the set of resources are based on performing the sensing and the respective occupancy state determinations for a second subset of the set of resources are based on a predetermined occupancy state.

In some examples, the occupancy state receiver 745 may be configured as or otherwise support a means for receiving, from the second wireless device or the third wireless device, an indication of the predetermined occupancy state.

In some examples, the predetermined occupancy state indicates that each resource of a second set of resources to which the second subset of the set of resources map has an available channel occupancy state, an unavailable channel occupancy state, or a selectively available channel occupancy state according to a value of a parameter.

In some examples, to support receiving the indication of the predetermined occupancy state, the occupancy state receiver 745 may be configured as or otherwise support a means for receiving radio resource control signaling or medium access control (MAC) control element signaling including the indication of the predetermined occupancy state.

In some examples, the resource indication receiver 725 may be configured as or otherwise support a means for receiving signaling indicating a quantity of resources in the set of resources, a quantity of resource blocks that a resource of the set of resources includes, or a combination thereof.

In some examples, the signaling includes radio resource control signaling, medium access control (MAC) control element signaling, or a sidelink shared channel transmission.

In some examples, the training process component 750 may be configured as or otherwise support a means for receiving an indication to initiate a training process for the weighted selection of resource sensing for the set of resources at the first wireless device, where selecting the sensing state is based on receiving the indication.

In some examples, the training process component 750 may be configured as or otherwise support a means for transmitting an indication of a result of the training process for the weighted selection of resource sensing for the set of resources.

In some examples, the sensing state component 755 may be configured as or otherwise support a means for receiving an indication of a third sensing state for the set of resources and a result associated with the third sensing state. In some examples, the weight adapter 760 may be configured as or otherwise support a means for adapting the respective weights of the sensing states based on receiving the indication of the third sensing state and the result associated with the third sensing state.

In some examples, the sensing state component 755 may be configured as or otherwise support a means for receiving, from the second wireless device, an indication of a configuration of the weighted selection of resource sensing for the set of resources, where selecting the sensing state is based on receiving the indication of the configuration of the weighted selection of resource sensing for the set of resources.

In some examples, the sensing state component 755 may be configured as or otherwise support a means for transmitting an indication of the selected sensing state.

In some examples, the resource indication receiver 725 may be configured as or otherwise support a means for determining a quantity of resources of the set of resources based on a transport block size for the message, a modulation and coding scheme associated with the message, or a combination thereof.

In some examples, the weight adapter 760 may be configured as or otherwise support a means for determining that a collision has occurred over at least one resource associated with the first subset of the set of resources. In some examples, the weight adapter 760 may be configured as or otherwise support a means for adjusting the respective weight of the selected sensing state based on determining that the collision has occurred.

In some examples, the weight adapter 760 may be configured as or otherwise support a means for determining that a channel busy ratio satisfies a threshold. In some examples, the weight adapter 760 may be configured as or otherwise support a means for adjusting the first weight of the first sensing state to a non-zero value and the respective weight for each other sensing state of the set of sensing states to a zero value based on determining that the channel busy ratio satisfies the threshold.

In some examples, the respective weight of each state of the set of states is based on a channel busy ratio, a channel occupancy ratio, a transmission priority, a quality of service, a battery status of the first wireless device, or any combination thereof.

In some examples, the occupancy state determinations for the first subset of the set of resources are based on a signal to interference ratio, a reference signal received power, or a combination thereof for one or more resources of the first subset of the set of resources.

In some examples, the first wireless device includes a first UE, the third wireless device includes a second UE, and the second wireless device includes a third UE or a base station.

Additionally or alternatively, the communications manager 720 may support wireless communication at a first wireless device in accordance with examples as disclosed herein. In some examples, the resource indication receiver 725 may be configured as or otherwise support a means for receiving, from a second wireless device, an indication of a set of resources associated with weighted selection of resource sensing. In some examples, the sensing state selector 730 may be configured as or otherwise support a means for selecting a sensing state of a set of sensing states for the set of resources based on applying a respective weight to each sensing state of the set of sensing states. In some examples, the sensing component 735 may be configured as or otherwise support a means for performing sensing over a first subset of the set of resources based on the selected sensing state. In some examples, the message communicator 740 may be configured as or otherwise support a means for communicating a message with a third wireless device based on respective occupancy state determinations for the set of resources.

Figure 8:
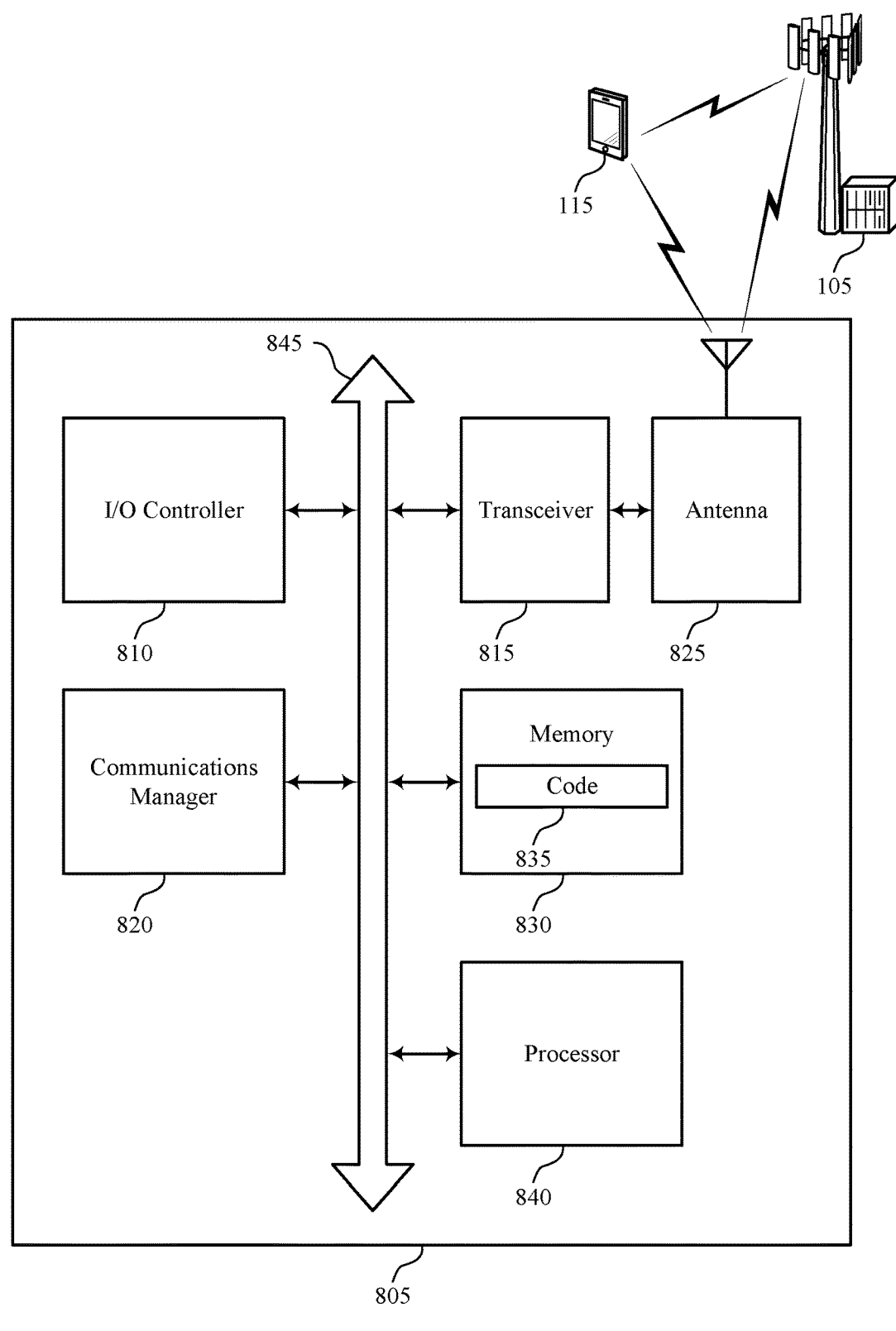
FIG. 8 shows a diagram of a system including a device that supports weighted decision process-based resource sensing in accordance with aspects of the present disclosure.

FIG. 8 shows a diagram of a system 800 including a device 805 that supports weighted decision process-based resource sensing in accordance with aspects of the present disclosure. The device 805 may be an example of or include the components of a device 505, a device 605, or a wireless device as described herein. The device 805 may include components for bi-directional voice and data communications including components for transmitting and receiving communications, such as a communications manager 820, an I/O controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random-access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting weighted decision process-based resource sensing). For example, the device 805 or a component of the device 805 may include a processor 840 and memory 830 coupled with or to the processor 840, the processor 840 and memory 830 configured to perform various functions described herein.

Additionally or alternatively, the communications manager 820 may support wireless communication at a first wireless device in accordance with examples as disclosed herein. For example, the communications manager 820 may be configured as or otherwise support a means for receiving, from a second wireless device, an indication of a set of resources associated with weighted selection of resource sensing. The communications manager 820 may be configured as or otherwise support a means for selecting a sensing state of a set of sensing states for the set of resources based on applying a respective weight to each sensing state of the set of sensing states, where a first weight of a first sensing state of the set of sensing states is different than a second weight of a second sensing state of the set of sensing states. The communications manager 820 may be configured as or otherwise support a means for performing sensing over a first subset of the set of resources based on the selected sensing state. The communications manager 820 may be configured as or otherwise support a means for communicating a message with a third wireless device based on respective occupancy state determinations for the set of resources, where the respective occupancy state determinations for the first subset of the set of resources are based on performing the sensing and the respective occupancy state determinations for a second subset of the set of resources are based on a predetermined occupancy state.

Additionally or alternatively, the communications manager 820 may support wireless communication at a first wireless device in accordance with examples as disclosed herein. For example, the communications manager 820 may be configured as or otherwise support a means for receiving, from a second wireless device, an indication of a set of resources associated with weighted selection of resource sensing. The communications manager 820 may be configured as or otherwise support a means for selecting a sensing state of a set of sensing states for the set of resources based on applying a respective weight to each sensing state of the set of sensing states. The communications manager 820 may be configured as or otherwise support a means for performing sensing over a first subset of the set of resources based on the selected sensing state. The communications manager 820 may be configured as or otherwise support a means for communicating a message with a third wireless device based on respective occupancy state determinations for the set of resources.

By including or configuring the communications manager 820 in accordance with examples as described herein, the device 805 may support techniques for the device 805 to adapt (e.g., adjust) weights such that the device 805 may be more likely to select sensing states associated with sensing resources that have an increased likelihood of collisions and refraining from sensing resources that have a decreased likelihood of collisions. By refraining from sensing the resources with the decreased likelihood of collisions, the device 805 may reduce latency associated with the sensing.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of weighted decision process-based resource sensing as described herein, or the processor 840 and the memory 830 may be otherwise configured to perform or support such operations.

FIG. 9 shows a flowchart illustrating a method 900 that supports weighted decision process-based resource sensing in accordance with aspects of the present disclosure. The operations of the method 900 may be implemented by a wireless device or its components as described herein. For example, the operations of the method 900 may be performed by a wireless device as described with reference to FIGS. 1 through 8. In some examples, a wireless device may execute a set of instructions to control the functional elements of the wireless device to perform the described functions. Additionally or alternatively, the wireless device may perform aspects of the described functions using special-purpose hardware.

At 905, the method may include receiving, from a second wireless device, an indication of a set of resources associated with weighted selection of resource sensing. The operations of 905 may be performed in accordance with examples as disclosed herein. In some examples, aspects of the operations of 905 may be performed by a resource indication receiver 725 as described with reference to FIG. 7.

At 910, the method may include selecting a sensing state of a set of sensing states for the set of resources based on applying a respective weight to each sensing state of the set of sensing states, where a first weight of a first sensing state of the set of sensing states is different than a second weight of a second sensing state of the set of sensing states. The operations of 910 may be performed in accordance with examples as disclosed herein. In some examples, aspects of the operations of 910 may be performed by a sensing state selector 730 as described with reference to FIG. 7.

At 915, the method may include performing sensing over a first subset of the set of resources based on the selected sensing state. The operations of 915 may be performed in accordance with examples as disclosed herein. In some examples, aspects of the operations of 915 may be performed by a sensing component 735 as described with reference to FIG. 7.

At 920, the method may include communicating a message with a third wireless device based on respective occupancy state determinations for the set of resources, where the respective occupancy state determinations for the first subset of the set of resources are based on performing the sensing and the respective occupancy state determinations for a second subset of the set of resources are based on a predetermined occupancy state. The operations of 920 may be performed in accordance with examples as disclosed herein. In some examples, aspects of the operations of 920 may be performed by a message communicator 740 as described with reference to FIG. 7.

Figure 10:
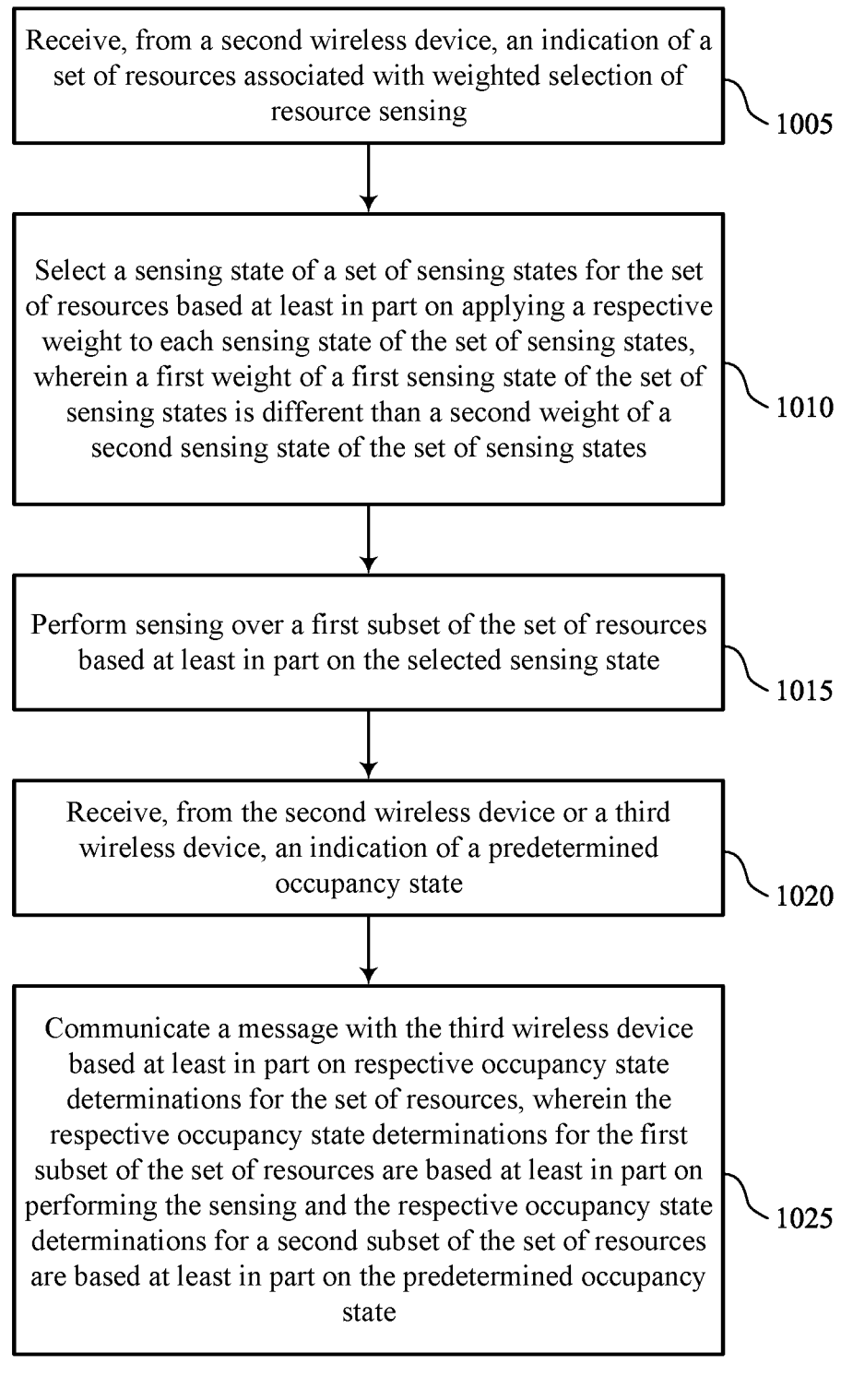

FIG. 10 shows a flowchart illustrating a method 1000 that supports weighted decision process-based resource sensing in accordance with aspects of the present disclosure. The operations of the method 1000 may be implemented by a wireless device or its components as described herein. For example, the operations of the method 1000 may be performed by a wireless device as described with reference to FIGS. 1 through 8. In some examples, a wireless device may execute a set of instructions to control the functional elements of the wireless device to perform the described functions. Additionally or alternatively, the wireless device may perform aspects of the described functions using special-purpose hardware.

At 1005, the method may include receiving, from a second wireless device, an indication of a set of resources associated with weighted selection of resource sensing. The operations of 1005 may be performed in accordance with examples as disclosed herein. In some examples, aspects of the operations of 1005 may be performed by a resource indication receiver 725 as described with reference to FIG. 7.

At 1010, the method may include selecting a sensing state of a set of sensing states for the set of resources based on applying a respective weight to each sensing state of the set of sensing states, where a first weight of a first sensing state of the set of sensing states is different than a second weight of a second sensing state of the set of sensing states. The operations of 1010 may be performed in accordance with examples as disclosed herein. In some examples, aspects of the operations of 1010 may be performed by a sensing state selector 730 as described with reference to FIG. 7.

At 1015, the method may include performing sensing over a first subset of the set of resources based on the selected sensing state. The operations of 1015 may be performed in accordance with examples as disclosed herein. In some examples, aspects of the operations of 1015 may be performed by a sensing component 735 as described with reference to FIG. 7.

At 1020, the method may include receiving, from the second wireless device or a third wireless device, an indication of a predetermined occupancy state. The operations of 1020 may be performed in accordance with examples as disclosed herein. In some examples, aspects of the operations of 1020 may be performed by an occupancy state receiver 745 as described with reference to FIG. 7.

At 1025, the method may include communicating a message with the third wireless device based on respective occupancy state determinations for the set of resources, where the respective occupancy state determinations for the first subset of the set of resources are based on performing the sensing and the respective occupancy state determinations for a second subset of the set of resources are based on the predetermined occupancy state. The operations of 1025 may be performed in accordance with examples as disclosed herein. In some examples, aspects of the operations of 1025 may be performed by a message communicator 740 as described with reference to FIG. 7.

FIG. 11 shows a flowchart illustrating a method 1100 that supports weighted decision process-based resource sensing in accordance with aspects of the present disclosure. The operations of the method 1100 may be implemented by a wireless device or its components as described herein. For example, the operations of the method 1100 may be performed by a wireless device as described with reference to FIGS. 1 through 8. In some examples, a wireless device may execute a set of instructions to control the functional elements of the wireless device to perform the described functions. Additionally or alternatively, the wireless device may perform aspects of the described functions using special-purpose hardware.

At 1105, the method may include receiving, from a second wireless device, an indication of a set of resources associated with weighted selection of resource sensing. The operations of 1105 may be performed in accordance with examples as disclosed herein. In some examples, aspects of the operations of 1105 may be performed by a resource indication receiver 725 as described with reference to FIG. 7.

At 1110, the method may include selecting a sensing state of a set of sensing states for the set of resources based on applying a respective weight to each sensing state of the set of sensing states, where a first weight of a first sensing state of the set of sensing states is different than a second weight of a second sensing state of the set of sensing states. The operations of 1110 may be performed in accordance with examples as disclosed herein. In some examples, aspects of the operations of 1110 may be performed by a sensing state selector 730 as described with reference to FIG. 7.

At 1115, the method may include performing sensing over a first subset of the set of resources based on the selected sensing state. The operations of 1115 may be performed in accordance with examples as disclosed herein. In some examples, aspects of the operations of 1115 may be performed by a sensing component 735 as described with reference to FIG. 7.

At 1120, the method may include communicating a message with a third wireless device based on respective occupancy state determinations for the set of resources, where the respective occupancy state determinations for the first subset of the set of resources are based on performing the sensing and the respective occupancy state determinations for a second subset of the set of resources are based on a predetermined occupancy state. The operations of 1120 may be performed in accordance with examples as disclosed herein. In some examples, aspects of the operations of 1120 may be performed by a message communicator 740 as described with reference to FIG. 7.

FIG. 12 shows a flowchart illustrating a method 1200 that supports weighted decision process-based resource sensing in accordance with aspects of the present disclosure. The operations of the method 1200 may be implemented by a wireless device or its components as described herein. For example, the operations of the method 1200 may be performed by a wireless device as described with reference to FIGS. 1 through 8. In some examples, a wireless device may execute a set of instructions to control the functional elements of the wireless device to perform the described functions. Additionally or alternatively, the wireless device may perform aspects of the described functions using special-purpose hardware.

At 1205, the method may include receiving, from a second wireless device, an indication of a set of resources associated with weighted selection of resource sensing. The operations of 1205 may be performed in accordance with examples as disclosed herein. In some examples, aspects of the operations of 1205 may be performed by a resource indication receiver 725 as described with reference to FIG. 7.

At 1210, the method may include selecting a sensing state of a set of sensing states for the set of resources based on applying a respective weight to each sensing state of the set of sensing states. The operations of 1210 may be performed in accordance with examples as disclosed herein. In some examples, aspects of the operations of 1210 may be performed by a sensing state selector 730 as described with reference to FIG. 7.

At 1215, the method may include performing sensing over a first subset of the set of resources based on the selected sensing state. The operations of 1215 may be performed in accordance with examples as disclosed herein. In some examples, aspects of the operations of 1215 may be performed by a sensing component 735 as described with reference to FIG. 7.

At 1220, the method may include communicating a message with a third wireless device based on respective occupancy state determinations for the set of resources. The operations of 1220 may be performed in accordance with examples as disclosed herein. In some examples, aspects of the operations of 1220 may be performed by a message communicator 740 as described with reference to FIG. 7.

The following provides an overview of aspects of the present disclosure:

Aspect 1: A method for wireless communication at a first wireless device, comprising: receiving, from a second wireless device, an indication of a set of resources associated with weighted selection of resource sensing; selecting a sensing state of a set of sensing states for the set of resources based at least in part on applying a respective weight to each sensing state of the set of sensing states, wherein a first weight of a first sensing state of the set of sensing states is different than a second weight of a second sensing state of the set of sensing states; performing sensing over a first subset of the set of resources based at least in part on the selected sensing state; and communicating a message with a third wireless device based at least in part on respective occupancy state determinations for the set of resources, wherein the respective occupancy state determinations for the first subset of the set of resources are based at least in part on performing the sensing and the respective occupancy state determinations for a second subset of the set of resources are based at least in part on a predetermined occupancy state.

Aspect 2: The method of aspect 1, further comprising: receiving, from the second wireless device or the third wireless device, an indication of the predetermined occupancy state.

Aspect 3: The method of aspect 2, wherein the predetermined occupancy state indicates that each resource of a second set of resources to which the second subset of the set of resources map has an available channel occupancy state, an unavailable channel occupancy state, or a selectively available channel occupancy state according to a value of a parameter.

Aspect 4: The method of any of aspects 2 through 3, wherein receiving the indication of the predetermined occupancy state comprises: receiving radio resource control signaling or medium access control (MAC) control element signaling comprising the indication of the predetermined occupancy state.

Aspect 5: The method of any of aspects 1 through 4, further comprising: receiving signaling indicating a quantity of resources in the set of resources, a quantity of resource blocks that a resource of the set of resources comprises, or a combination thereof.

Aspect 6: The method of aspect 5, wherein the signaling comprises radio resource control signaling, medium access control (MAC) control element signaling, or a sidelink shared channel transmission.

Aspect 7: The method of any of aspects 1 through 6, further comprising: receiving an indication to initiate a training process for the weighted selection of resource sensing for the set of resources at the first wireless device, wherein selecting the sensing state is based at least in part on receiving the indication.

Aspect 8: The method of aspect 7, further comprising: transmitting an indication of a result of the training process for the weighted selection of resource sensing for the set of resources.

Aspect 9: The method of any of aspects 1 through 8, further comprising: receiving an indication of a third sensing state for the set of resources and a result associated with the third sensing state; and adapting the respective weights of the sensing states based at least in part on receiving the indication of the third sensing state and the result associated with the third sensing state.

Aspect 10: The method of any of aspects 1 through 9, further comprising: receiving, from the second wireless device, an indication of a configuration of the weighted selection of resource sensing for the set of resources, wherein selecting the sensing state is based at least in part on receiving the indication of the configuration of the weighted selection of resource sensing for the set of resources.

Aspect 11: The method of any of aspects 1 through 10, further comprising: transmitting an indication of the selected sensing state Aspect 12: The method of any of aspects 1 through 11, further comprising: determining a quantity of resources of the set of resources based at least in part on a transport block size for the message, a modulation and coding scheme associated with the message, or a combination thereof.

Aspect 13: The method of any of aspects 1 through 12, further comprising: determining that a collision has occurred over at least one resource associated with the first subset of the set of resources; and adjusting the respective weight of the selected sensing state based at least in part on determining that the collision has occurred.

Aspect 14: The method of any of aspects 1 through 13, further comprising: determining that a channel busy ratio satisfies a threshold; adjusting the first weight of the first sensing state to a non-zero value and the respective weight for each other sensing state of the set of sensing states to a zero value based at least in part on determining that the channel busy ratio satisfies the threshold.

Aspect 15: The method of any of aspects 1 through 14, wherein the respective weight of each sensing state of the set of sensing states is based at least in part on a channel busy ratio, a channel occupancy ratio, a transmission priority, a quality of service, a battery status of the first wireless device, or any combination thereof.

Aspect 16: The method of any of aspects 1 through 15, wherein the occupancy state determinations for the first subset of the set of resources are based at least in part on a signal to interference ratio, a reference signal received power, or a combination thereof for one or more resources of the first subset of the set of resources Aspect 17: The method of any of aspects 1 through 16, wherein the first wireless device comprises a first UE, the third wireless device comprises a second UE, and the second wireless device comprises a third UE or a base station Aspect 18: An apparatus for wireless communication at a first wireless device, comprising a processor; memory coupled with the processor; and instructions stored in the memory and executable by the processor to cause the apparatus to perform a method of any of aspects 1 through 17.

Aspect 19: An apparatus for wireless communication at a first wireless device, comprising at least one means for performing a method of any of aspects 1 through 17.

Aspect 20: A non-transitory computer-readable medium storing code for wireless communication at a first wireless device, the code comprising instructions executable by a processor to perform a method of any of aspects 1 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first wireless device, comprising:

one or more memories;

a receiver configured to receive, from a second wireless device, an indication of a set of resources in a resource sensing window associated with weighted selection of resource sensing; and one or more processors coupled to the one or more memories and configured to:

select a sensing state of a set of sensing states for the set of resources in the resource sensing window based at least in part on applying a respective weight to each sensing state of the set of sensing states, wherein a first weight of a first sensing state of the set of sensing states is different than a second weight of a second sensing state of the set of sensing states, and wherein the sensing state indicates the first wireless device is to perform sensing over a first subset of the set of resources and is to refrain from performing sensing over a second subset of the set of resources;

perform sensing over the first subset of the set of resources in the resource sensing window based at least in part on the selected sensing state; and communicate a message with a third wireless device via one or more resources of a second set of resources in a resource selection window based at least in part on respective occupancy state determinations for the set of resources in the resource sensing window, wherein the respective occupancy state determinations for the first subset of the set of resources in the resource sensing window are based at least in part on performing the sensing and the respective occupancy state determinations for the second subset of the set of resources in the resource sensing window are based at least in part on a predetermined occupancy state, wherein the predetermined occupancy state of the second subset of the set of resources over which the first wireless device refrains from performing sensing indicates a probability that each resource of a third subset of resources of the second set of resources in the resource selection window has an available channel occupancy state or an unavailable occupancy state, and wherein the second subset of the set of resources in the resource sensing window map to the third subset of resources of the second set of resources in the resource selection window.

2. The apparatus of claim 1, wherein the receiver is further configured to:

receive, from the second wireless device or the third wireless device, an indication of the predetermined occupancy state.

3. The apparatus of claim 2, wherein the receiver being configured to receive the indication of the predetermined occupancy state comprises the one or more processors being configured to:

receive radio resource control signaling or medium access control (MAC) control element signaling comprising the indication of the predetermined occupancy state.

4. The apparatus of claim 1, wherein the receiver is further configured to:

receive signaling indicating a quantity of resources in the set of resources, a quantity of resource blocks that a resource of the set of resources comprises, or a combination thereof.

5. The apparatus of claim 4, wherein the signaling comprises radio resource control signaling, medium access control (MAC) control element signaling, or a sidelink shared channel transmission.

6. The apparatus of claim 1, wherein the receiver is further configured to:

receive an indication to initiate a training process for the weighted selection of resource sensing for the set of resources at the first wireless device, wherein selecting the sensing state is based at least in part on receiving the indication.

7. The apparatus of claim 6, wherein the one or more processors are further configured to:

transmit an indication of a result of the training process for the weighted selection of resource sensing for the set of resources.

8. The apparatus of claim 1, wherein the receiver is further configured to receive an indication of a third sensing state for the set of resources and a result associated with the third sensing state, and wherein the one or more processors are further configured to:

adapt the respective weights of the set of sensing states based at least in part on receiving the indication of the third sensing state and the result associated with the third sensing state.

9. The apparatus of claim 1, wherein the receiver is further configured to:

receive, from the second wireless device, an indication of a configuration of the weighted selection of resource sensing for the set of resources, wherein selecting the sensing state is based at least in part on receiving the indication of the configuration of the weighted selection of resource sensing for the set of resources.

10. The apparatus of claim 1, wherein the one or more processors are further configured to:

transmit an indication of the selected sensing state.

11. The apparatus of claim 1, wherein the one or more processors are further configured to:

determine a quantity of resources of the set of resources based at least in part on a transport block size for the message, a modulation and coding scheme associated with the message, or a combination thereof.

12. The apparatus of claim 1, wherein the one or more processors are further configured to:

determine that a collision has occurred over at least one resource in the second set of resources that is associated with the first subset of the set of resources; and adjust the respective weight of the selected sensing state based at least in part on determining that the collision has occurred.

13. The apparatus of claim 1, wherein the one or more processors are further configured to:

determine that a channel busy ratio satisfies a threshold; and adjust the first weight of the first sensing state to a non-zero value and the respective weight for each other sensing state of the set of sensing states to a zero value based at least in part on determining that the channel busy ratio satisfies the threshold.

14. The apparatus of claim 1, wherein the respective weight of each sensing state of the set of sensing states is based at least in part on a channel busy ratio, a channel occupancy ratio, a transmission priority, a quality of service, a battery status of the first wireless device, or any combination thereof.

15. The apparatus of claim 1, wherein the occupancy state determinations for the first subset of the set of resources are based at least in part on a signal to interference ratio, a reference signal received power, or a combination thereof for one or more resources of the first subset of the set of resources.

16. The apparatus of claim 1, wherein the first wireless device comprises a first user equipment (UE), the third wireless device comprises a second UE, and the second wireless device comprises a third UE or a base station.

17. A method for wireless communication at a first wireless device, comprising:

receiving, from a second wireless device, an indication of a set of resources in a resource sensing window associated with weighted selection of resource sensing;

selecting a sensing state of a set of sensing states for the set of resources in the resource sensing window based at least in part on applying a respective weight to each sensing state of the set of sensing states, wherein a first weight of a first sensing state of the set of sensing states is different than a second weight of a second sensing state of the set of sensing states, and wherein the sensing state indicates the first wireless device is to perform sensing over a first subset of the set of resources and is to refrain from performing sensing over a second subset of the set of resources;

performing sensing over the first subset of the set of resources in the resource sensing window based at least in part on the selected sensing state; and communicating a message with a third wireless device via one or more resources of a second set of resources in a resource selection window based at least in part on respective occupancy state determinations for the set of resources in the resource sensing window, wherein the respective occupancy state determinations for the first subset of the set of resources in the resource sensing window are based at least in part on performing the sensing and the respective occupancy state determinations for the second subset of the set of resources in the resource sensing window are based at least in part on a predetermined occupancy state, wherein the predetermined occupancy state of the second subset of the set of resources over which the first wireless device refrains from performing sensing indicates a probability that each resource of a third subset of resources of the second set of resources in the resource selection window has an available channel occupancy state or an unavailable occupancy state, and wherein the second subset of the set of resources in the resource sensing window map to the third subset of resources of the second set of resources in the resource selection window.

18. The method of claim 17, further comprising:

receiving, from the second wireless device or the third wireless device, an indication of the predetermined occupancy state.

19. The method of claim 18, wherein the predetermined occupancy state indicates that each resource of a second set of resources to which the second subset of the set of resources map has an available channel occupancy state, an unavailable channel occupancy state, or a selectively available channel occupancy state according to a value of a parameter.

20. The method of claim 18, wherein receiving the indication of the predetermined occupancy state comprises:

receiving radio resource control signaling or medium access control (MAC) control element signaling comprising the indication of the predetermined occupancy state.

21. The method of claim 17, further comprising:

receiving signaling indicating a quantity of resources in the set of resources, a quantity of resource blocks that a resource of the set of resources comprises, or a combination thereof.

22. The method of claim 21, wherein the signaling comprises radio resource control signaling, medium access control (MAC) control element signaling, or a sidelink shared channel transmission.

23. The method of claim 17, further comprising:

receiving an indication to initiate a training process for the weighted selection of resource sensing for the set of resources at the first wireless device, wherein selecting the sensing state is based at least in part on receiving the indication.

24. The method of claim 23, further comprising:

transmitting an indication of a result of the training process for the weighted selection of resource sensing for the set of resources.

25. The method of claim 17, further comprising:

receiving an indication of a third sensing state for the set of resources and a result associated with the third sensing state; and adapting the respective weights of the set of sensing states based at least in part on receiving the indication of the third sensing state and the result associated with the third sensing state.

26. The method of claim 17, further comprising:

receiving, from the second wireless device, an indication of a configuration of the weighted selection of resource sensing for the set of resources, wherein selecting the sensing state is based at least in part on receiving the indication of the configuration of the weighted selection of resource sensing for the set of resources.

27. An apparatus for wireless communication at a first wireless device, comprising:

means for receiving, from a second wireless device, an indication of a set of resources in a resource sensing window associated with weighted selection of resource sensing;

means for selecting a sensing state of a set of sensing states for the set of resources in the resource sensing window based at least in part on applying a respective weight to each sensing state of the set of sensing states, wherein a first weight of a first sensing state of the set of sensing states is different than a second weight of a second sensing state of the set of sensing states, and wherein the sensing state indicates the first wireless device is to perform sensing over a first subset of the set of resources and is to refrain from performing sensing over a second subset of the set of resources;

means for performing sensing over the first subset of the set of resources in the resource sensing window based at least in part on the selected sensing state; and means for communicating a message with a third wireless device via one or more resources of a second set of resources in a resource selection window based at least in part on respective occupancy state determinations for the set of resources in the resource sensing window, wherein the respective occupancy state determinations for the first subset of the set of resources in the resource sensing window are based at least in part on performing the sensing and the respective occupancy state determinations for the second subset of the set of resources in the resource sensing window are based at least in part on a predetermined occupancy state, wherein the predetermined occupancy state of the second subset of the set of resources over which the first wireless device refrains from performing sensing indicates a probability that each resource of a third subset of resources of the second set of resources in the resource selection window has an available channel occupancy state or an unavailable occupancy state, and wherein the second subset of the set of resources in the resource sensing window map to the third subset of resources of the second set of resources in the resource selection window.

28. A non-transitory computer-readable medium storing code for wireless communication at a first wireless device, the code comprising instructions executable by a processor to:

receive, from a second wireless device, an indication of a set of resources in a resource sensing window associated with weighted selection of resource sensing;

select a sensing state of a set of sensing states for the set of resources in the resource sensing window based at least in part on applying a respective weight to each sensing state of the set of sensing states, wherein a first weight of a first sensing state of the set of sensing states is different than a second weight of a second sensing state of the set of sensing states, and wherein the sensing state indicates the first wireless device is to perform sensing over a first subset of the set of resources and is to refrain from performing sensing over a second subset of the set of resources;

perform sensing over the first subset of the set of resources in the resource sensing window based at least in part on the selected sensing state; and communicate a message with a third wireless device via one or more resources of a second set of resources in a resource selection window based at least in part on respective occupancy state determinations for the set of resources in the resource sensing window, wherein the respective occupancy state determinations for the first subset of the set of resources in the resource sensing window are based at least in part on performing the sensing and the respective occupancy state determinations for the second subset of the set of resources in the resource sensing window are based at least in part on a predetermined occupancy state, wherein the predetermined occupancy state of the second subset of the set of resources over which the first wireless device refrains from performing sensing indicates a probability that each resource of a third subset of resources of the second set of resources in the resource selection window has an available channel occupancy state or an unavailable occupancy state, and wherein the second subset of the set of resources in the resource sensing window map to the third subset of resources of the second set of resources in the resource selection window.

* * * * *